(12) United States Patent
Rugeland et al.

(10) Patent No.: US 11,356,838 B2
(45) Date of Patent: Jun. 7, 2022

(54) TRACKING AREA UPDATE IN RRC_INACTIVE

(71) Applicant: Telefonaktiebolaget LM Ericsson (publ), Stockholm (SE)

(72) Inventors: Patrik Rugeland, Stockholm (SE); Gunnar Mildh, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 118 days.

(21) Appl. No.: 16/078,165

(22) PCT Filed: Dec. 13, 2017

(86) PCT No.: PCT/IB2017/057910
§ 371 (c)(1),
(2) Date: Aug. 21, 2018

(87) PCT Pub. No.: WO2018/130889
PCT Pub. Date: Jul. 19, 2018

(65) Prior Publication Data
US 2020/0359191 A1    Nov. 12, 2020

Related U.S. Application Data

(60) Provisional application No. 62/446,743, filed on Jan. 16, 2017.

(51) Int. Cl.
*H04W 8/02* (2009.01)
*H04W 76/19* (2018.01)
(Continued)

(52) U.S. Cl.
CPC ............ *H04W 8/02* (2013.01); *H04W 76/19* (2018.02); *H04W 76/27* (2018.02); *H04W 84/042* (2013.01)

(58) Field of Classification Search
CPC ..... H04W 76/30; H04W 76/28; H04W 76/27; H04W 76/20; H04W 76/19; H04W 76/11;
(Continued)

(56) References Cited

U.S. PATENT DOCUMENTS 10,820,185 B2 * 10/2020 Faccin .................... H04W 8/06
11,083,043 B2 *  8/2021 Sugawara ............. H04W 76/12
(Continued)

OTHER PUBLICATIONS

International Search Report for International application No. PCT/IB2017/057910—dated May 17, 2018.
(Continued)

*Primary Examiner* — Jean A Gelin
(74) *Attorney, Agent, or Firm* — Baker Botts, LLP

(57) ABSTRACT

A method in a network node (115) comprises receiving (615, 715, 820, 920, 1015, 1304), from a user equipment (UE) (110) configured in an inactive state (605, 705, 805, 905, 1005), a request to resume a connection as part of a non-access stratum procedure. The method comprises resuming (620, 720, 825, 925, 1020, 1308) the connection in response to the request. The method comprises obtaining (645, 745, 845, 945, 1045, 1312) an indication that signaling associated with the non-access stratum procedure is complete.

12 Claims, 20 Drawing Sheets

(51) Int. Cl.
*H04W 76/27* (2018.01)
*H04W 84/04* (2009.01)

(58) Field of Classification Search
CPC . H04W 68/00; H04W 68/05; H04W 36/0016; H04W 36/0055; H04W 8/06; H04W 8/20; H04W 8/08; H04W 84/042
See application file for complete search history.

(56) References Cited

U.S. PATENT DOCUMENTS

| | | | | |
|---|---|---|---|---|
| 2013/0260811 | A1 | 10/2013 | Rayavarapu | |
| 2013/0288726 | A1* | 10/2013 | Lair | H04W 72/0406 455/466 |
| 2015/0296495 | A1* | 10/2015 | Yasuda | H04W 16/32 370/329 |
| 2016/0182711 | A1* | 6/2016 | Xing | H04M 3/2263 455/424 |
| 2017/0280491 | A1* | 9/2017 | Salkintzis | H04W 8/265 |
| 2017/0311278 | A1* | 10/2017 | Adjakple | H04W 72/04 |
| 2017/0332424 | A1* | 11/2017 | Salot | H04W 4/02 |
| 2018/0041901 | A1* | 2/2018 | Yilmaz | H04W 60/005 |
| 2018/0176847 | A1* | 6/2018 | Fasil Abdul | H04J 11/0093 |
| 2018/0198867 | A1* | 7/2018 | Dao | H04W 76/30 |
| 2018/0352416 | A1* | 12/2018 | Ryu | H04W 4/08 |
| 2018/0376445 | A1* | 12/2018 | Yoon | H04W 76/30 |
| 2019/0021064 | A1* | 1/2019 | Ryu | H04W 60/06 |
| 2019/0045572 | A1* | 2/2019 | Kim | H04W 76/27 |
| 2019/0053045 | A1* | 2/2019 | Cho | H04W 68/02 |
| 2019/0141769 | A1* | 5/2019 | Jin | H04W 76/15 |
| 2019/0215800 | A1* | 7/2019 | Fujishiro | H04W 68/02 |
| 2019/0357020 | A1* | 11/2019 | Chandramouli | H04W 60/00 |
| 2020/0059989 | A1* | 2/2020 | Velev | H04W 8/08 |
| 2020/0068481 | A1* | 2/2020 | Kim | H04W 36/14 |
| 2020/0120570 | A1* | 4/2020 | Youn | H04W 76/11 |
| 2020/0275302 | A1* | 8/2020 | Youn | H04W 28/0268 |

OTHER PUBLICATIONS

3GPP TSG-RAN2 Meeting #92; Anaheim, USA; Source: HTC; Title: RRC aspects in NB-IoT (R2-156425)—Nov. 16-20, 2015.

3GPP TSG-RAN WG2-AH; Spokane, Washington, U.S.; Source: Ericsson; Title: DRX in RRC_IDLE and RRC_INACTIVE state (Tdod R2-1700537)—Jan. 17-19, 2017.

Examination Report issued by the People's Republic of Bangladesh Department of Patents, Designs & Trademarks for Patent Application No. 301/2017/736—Feb. 7, 2019.

* cited by examiner

TRACKING AREA UPDATE IN RRC_INACTIVE

PRIORITY

This nonprovisional application is a U.S. National Stage Filing under 35 U.S.C. § 371 of International Patent Application Serial No. PCT/IB2017/057910 filed Dec. 13, 2017, and entitled "TRACKING AREA UPDATE IN RRC_INACTIVE" which claims priority to U.S. Provisional Patent Application No. 62/446,743 filed Jan. 16, 2017, both of which are hereby incorporated by reference in their entirety.

TECHNICAL FIELD

The present disclosure relates, in general, to wireless communications and, more particularly, to tracking area updates.

BACKGROUND

In the 3rd Generation Partnership Project (3GPP) study item "Next Generation New Radio (NR) Access Technology," it is proposed that the Radio Resource Control (RRC) state model should be extended from two states (RRC_IDLE and RRC_CONNECTED) to three states (RRC_IDLE, RRC_CONNECTED, and the new RRC_INACTIVE). A similar state model is also considered for Long Term Evolution (LTE) when LTE is connected to the Next Generation Core Network (CN) (also referred to as 5G-CN).

The exact characteristics and properties of the new RRC_INACTIVE state are currently being standardized. One aspect of the RRC_INACTIVE state is that the User Equipment (UE) and the Radio Access Network (RAN) store the Access Stratum (AS) context, and that the CN/RAN interface (called S1 in LTE/Evolved Packet Core (EPC) and NG-C in NR and LTE when connected to 5G-CN) is kept. This means that when a UE needs to reconnect to the network, it can resume the old connection, which can be much faster than setting up a new connection.

FIG. 1 illustrates an example of the high-level next-generation network architecture 100. Next-generation network architecture 100 includes Next Generation CN (NG-CN or 5G-CN) 5 and two network nodes 10A and 10B. In the example of FIG. 1, network node 10A is an LTE evolved NodeB (eNB), and network node 10B is an NR base station (BS)(also referred to as a gNB). RAN nodes 10A and 10B are connected to NG-CN 5 using NG-C control plane (CP) and NG-U user plane (UP) interfaces 15. Network nodes 10A and 10B are connected to each other over XN interface 20.

FIG. 2 illustrates the proposed state transitions for NR. More particularly, FIG. 2 illustrates the three proposed states: RRC_IDLE 205; RRC_CONNECTED 210; and RRC_INACTIVE 215. As shown in FIG. 2, a UE can transition between RRC_IDLE state 205, RRC_CONNECTED state 210, and RRC_INACTIVE state 215 in a variety of ways. For example, a UE in RRC_IDLE state 205 may perform an RRCConnectionSetup procedure 220 to transition from RRC_IDLE state 205 to RRC_CONNECTED state 210. Once in RRC_CONNECTED state 210, the UE may transition back to RRC_IDLE state 205 via RRCConnectionRelease procedure 225.

Alternatively, the UE may transition from RRC_CONNECTED state 210 to RRC_INACTIVE state 215. For example, the UE may transition from RRC_CONNECTED state 210 to RRC_INACTIVE state 215 via RRCConnectionSuspend procedure 230. From RRC_INACTIVE state 215, the UE may transition back to RRC_CONNECTED state 210 via RRCConnectionResume procedure 235 or RRCConnectionSetup procedure 220 (as described in more detail below). The UE may also transition from RRC_INACTIVE state 215 to RRC_IDLE state 205, for example via RRCConnectionReject procedure 240.

The proposed procedures to transition between the states are described in R2-1700535 entitled "RRC state machine and RRC_INACTIVE characteristics," and are further described in more detail below.

It is also proposed that even if the UE has stored the context in RRC_INACTIVE state 215, the RAN can at any time discard the context and the CN/RAN connection when the UE is in RRC_INACTIVE state 215. In the case in which the RAN has discarded the context, the RAN will inform the UE about this when the UE sends an RRCConnectionResumeRequest as part of RRCConnectionResume procedure 235. Specifically, the RAN will inform the UE by responding to the RRCConnectionResumeRequest with an RRCConnectionSetup message instead of an RRCConnectionResume message. In such a scenario, the UE will also discard the context and continue to setup the RRC connection with the RRCConnectionSetupComplete message.

When the AS context is stored, and the CN/RAN connection is maintained, the CN is unaware that the UE is in RRC_INACTIVE state 215, and will consider the UE to be in ECM_CONNECTED (or the equivalent NR CN state). This means that the CN will not page the UE when an incoming downlink (DL) packet arrives. Instead, the CN will send the packets over the NG-U UP interface to the RAN, and the RAN node will initiate paging (or notification) if needed.

Another aspect of RRC_INACTIVE state 215 is the proposal of a RAN-based notification area. There have been a number of 3GPP RAN2 agreements concerning the RAN-based notification area. First, RAN2 assumes that the UE performs a CN-level location update when crossing a tracking area (TA) boundary when in inactive (in addition to RAN updates based on RAN areas). Second, there will be an NG Core/CN Location Area code (similar to the TA code) broadcast in system information of an NR Cell. Third, the RAN-based notification area is UE-specific and configurable by the gNB via dedicated signalling. Fourth, there will be a unique global Cell ID broadcast in system information of the NR Cell. Fifth, for the inactive state there will be a way to configure the UE with a RAN-based notification area that is smaller than a TA. Sixth, it has been agreed that a RAN notification area can cover a single cell or multiple cells.

Basically, the RAN-based notification area (referred to herein as "RAN area") allows the UE to move freely within the RAN area without informing the network. When the UE wants to transmit data, it shall be able to resume its connection. As can be noted from the agreements, even if the UE can freely move within the RAN area, it will still be tracked by the CN within the TAs since the UE is expected to perform Tracking Area Updates (TAUs) to the CN due to mobility. Further details on the TA updates are described below. To handle the RAN areas, the UE will also perform RAN area updates.

When a UE performs a TAU, this is initiated by the Non-Access Stratum (NAS) layer in the UE and is triggered by, for example (and as described in 3GPP Technical Specification (TS) 23.401): the UE detecting that it has entered a new TA that is not in the list of Tracking Area Indices (TAIs) that the UE registered with the network; and/or expiration of the periodic TA update timer. The UE would generate a TAU Request NAS message that is transmitted to the NAS layer in the network node (e.g., gNB) when the UE is connected.

In LTE Release 8, TAU requests are sent when the UE is in IDLE (when no S1 connection is setup) and use the RRC connection establishment procedure. In this case, the UE will indicate in the cause value of the RRConnectionSetupRequest message "mo-signalling." When the RAN receives the TAI Request message, this is forwarded to the Mobility Management Entity (MME). When the CN is finished with the TAU, the MME transmits a TAU Accept message to the UE. After the TAU Accept message, the CN signals to the RAN to release the temporary CN/RAN connection, and the RAN can release the UE back to RRC_IDLE state 205.

In LTE Release 13, the concept of RRCConnectionResume procedure 235 was introduced. With RRCConnectionResume procedure 235, the AS context is stored in the UE and in the network when the UE is in RRC_IDLE state 205. In this case, there is still no S1 UE connection set up between the RAN and CN when the UE is in RRC_IDLE state 205. If the UE supports the RRC connection resume procedure, it will perform a TAU by sending a RRCConnectionSetupRequest message with cause value "mo-signalling." The cause value indicates to the RAN that it should not initiate resumption of the complete UE context, but instead should forward the "TAU Request" message or any other NAS signalling to the MME. When the CN is finished with the TAU, the MME transmits a "TAU Accept" message to the UE. After the "TAU Accept" message, the CN signals to the RAN to release the temporary CN/RAN connection and the RAN can release the UE to RRC_IDLE state 205 with a suspended AS context.

The LTE states and procedures defined in Release 8 and Release 13 are different from NR RRC_INACTIVE and the procedures currently being standardized in that the CN/RAN connection (S1 or NG-C) is not kept in LTE Release 8 and Release 13.

The proposed procedures for Suspend and Resume for the new RRC state RRC_INACTIVE are illustrated in FIG. 3 and FIG. 4. During both of the procedures illustrated in FIGS. 3 and 4, the CN/RAN connection between the gNB and the NG-CN is kept (meaning that NR gNB-CN signaling is not needed).

FIG. 3 is a signal flow diagram illustrating an example of a successful RRCConnectionSuspend procedure. More particularly, FIG. 3 illustrates an exchange of messages between UE 110 and a network node 115 (e.g., an NR gNB in the example of FIG. 3). At step 305, UE 110 is in RRC_CONNECTED state. At step 310, user data is exchanged between UE 110 and network node 115. At step 315, network node 115 sends an RRC Connection Suspend message to UE 110. At step 320, UE 110 enters RRC_INACTIVE state.

FIG. 4 illustrates an example of a successful RRCConnectionResume procedure. More particularly, FIG. 4 illustrates an exchange of messages between UE 110 and a network node 115 (e.g., an NR gNB in the example of FIG. 4). At step 405, UE 110 is in RRC_INACTIVE state. At step 410, network node 115 sends a paging message to UE 110. At step 415, UE 110 performs Access Information acquisition.

At step 420, UE 110 sends a Physical Random Access Channel (PRACH) preamble to network node 115. At step 425, network node 115 sends a Random Access Response (RAR) to UE 110. At step 430, UE 110 sends an RRC Connection Resume Request message to network node 115. At step 435, network node 115 sends an RRC Connection Resume message to UE 110. At step 440, UE 110 enters RRC_CONNECTED state. At step 445, UE 110 sends a RRC Connection Resume Complete message to network node 115. At step 450, user data is exchanged between UE 110 and network node 115.

SUMMARY

To address problems with existing approaches, disclosed is a method in a user equipment (UE). The method comprises initiating, while the UE is configured in an inactive state, resumption of a connection with a network node prior to completing a non-access stratum procedure. The method comprises determining that signaling associated with the non-access stratum procedure is complete. The method comprises sending a message to the network node, the message indicating that the signaling associated with the non-access stratum procedure is complete.

In certain embodiments, the method may further comprise receiving, from the network node, in response to sending the message indicating that the signaling associated with the non-access stratum procedure is complete, an instruction to suspend the connection.

In certain embodiments, the non-access stratum procedure may comprise at least one of: a tracking area update; an attach procedure; a registration procedure; a protocol data unit session activation; and an authentication procedure.

In certain embodiments, sending the message to the network node may comprise transmitting, by a radio resource control layer of the UE, the message to a radio resource control layer of the network node.

In certain embodiments, initiating resumption of the connection with the network node prior to completing a non-access stratum procedure may comprise sending, to the network node, a request to resume the connection, and receiving, from the network node, a connection resume message. The request to resume the connection may comprise an indication of a type of non-access stratum procedure being performed by the UL.

In certain embodiments, the non-access stratum procedure may be a tracking area update, and the method may comprise sending, to the network node, a tracking area update request message. In certain embodiments, the method may further comprise receiving a tracking area update accept message indicating that the tracking area update procedure has been completed. Determining that the signaling associated with the non-access stratum procedure is complete may comprise obtaining, at the radio resource control layer of the UE, an indication from a non-access stratum layer of the UE that the UE has received the tracking area update accept message.

In certain embodiments, the method may further comprise sending another message to the network node, after initiating the non-access stratum procedure, indicating that the non-access stratum procedure has started or is ongoing.

Also disclosed is a user equipment (UE). The UE comprises a receiver, a transmitter, and processing circuitry coupled to the receiver and the transmitter. The processing circuitry is configured to initiate, while the UE is configured in an inactive state, resumption of a connection with a network node prior to completing a non-access stratum procedure. The processing circuitry is configured to determine that signaling associated with the non-access stratum procedure is complete. The processing circuitry is configured to send, via the transmitter, a message to the network node, the message indicating that the signaling associated with the non-access stratum procedure is complete.

Also disclosed is a method in a core network node. The method comprises performing a non-access stratum procedure associated with a user equipment (UE). The method comprises sending, to a network node, an indication that signaling associated with the non-access stratum procedure is complete.

In certain embodiments, the core network node may be a mobility management entity, and the network node may be one of a gNB or an eNB. In certain embodiments, the non-access stratum procedure may comprise at least one of: a tracking area update; an attach procedure; a registration procedure; a protocol data unit session activation; and an authentication procedure.

In certain embodiments, the non-access stratum procedure may comprise the tracking area update, and the indication that the signaling associated with the non-access stratum procedure is complete may be a tracking area update accept message. In certain embodiments, the non-access stratum procedure may comprise the tracking area update, and the indication that the signaling associated with the non-access stratum procedure is complete may be a signal from a non-access stratum layer of the core network node. In certain embodiments, the signal from the non-access stratum layer of the core network node may be sent as part of an S1 or NG-C message used to carry the tracking area update accept message. In certain embodiments, the signal from the non-access stratum layer of the core network node may be sent separate from an S1 or NG-C message used to carry the tracking area update accept message.

In certain embodiments, the method may further comprise sending another message to the network node, after the non-access stratum procedure has been initiated, indicating that the non-access stratum procedure has started or is ongoing.

Also disclosed is a core network node. The core network node comprises a network interface and processing circuitry coupled to the network interface. The processing circuitry is configured to perform a non-access stratum procedure associated with a user equipment (UE). The processing circuitry is configured to send, via the network interface to a network node, an indication that signaling associated with the non-access stratum procedure is complete.

Also disclosed is a method in a network node. The method comprises receiving, from a user equipment (UE) configured in an inactive state, a request to resume a connection as part of a non-access stratum procedure. The method comprises resuming the connection in response to the request. The method comprises obtaining an indication that signaling associated with the non-access stratum procedure is complete.

In certain embodiments, the method may further comprise, in response to obtaining the indication, suspending the connection. In certain embodiments, the method may further comprise, in response to obtaining the indication, releasing the connection.

In certain embodiments, the non-access stratum procedure may comprise at least one of: a tracking area update; an attach procedure; a registration procedure; a protocol data unit session activation; and an authentication procedure.

In certain embodiments, the request to resume the connection may indicate a type of non-access stratum procedure being performed by the UE.

In certain embodiments, obtaining the indication that signaling associated with the non-access stratum procedure is complete may comprise determining that signaling associated with the non-access stratum procedure is complete based on statistical information related to non-access stratum procedures. In certain embodiments, obtaining the indication that signaling associated with the non-access stratum procedure is complete may comprise initiating a timer, and, in response to the timer expiring, determining that the signaling associated with the non-access stratum procedure is complete.

In certain embodiments, obtaining the indication that signaling associated with the non-access stratum procedure is complete may comprise receiving, from one of a core network node or the UE, the indication that the signaling associated with the non-access stratum procedure is complete. The indication that the signaling associated with the non-access stratum procedure is complete may be received from at least one of: a non-access stratum layer of the core network node; and a non-access stratum layer of the UE. In certain embodiments, the indication that the signaling associated with the non-access stratum procedure is complete may be included in a message that is part of the non-access stratum procedure. In certain embodiments, the indication that the signaling associated with the non-access stratum procedure is complete may be included in a separate message that is not a part of the non-access stratum procedure.

In certain embodiments, the method may further comprise determining that the non-access stratum procedure is a tracking area update, and, in response to determining that the non-access stratum procedure is a tracking area update, instructing the UE to perform a radio access network (RAN) area update.

Also disclosed is a network node. The network node comprises a receiver, a transmitter, and processing circuitry coupled to the receiver and the transmitter. The processing circuitry is configured to receive, via the receiver from a user equipment (UE) configured in an inactive state, a request to resume a connection as part of a non-access stratum procedure. The processing circuitry is configured to resume the connection in response to the request. The processing circuitry is configured to obtain an indication that signaling associated with the non-access stratum procedure is complete.

Also disclosed is a method in a user equipment (UE). The method comprises determining that a radio access network (RAN) area update has been triggered. The method comprises sending, to a network node, a request to resume a connection, the request comprising an indication that the request is associated with the RAN area update. The method comprises receiving, from the network node, a connection suspend message, the connection suspend message comprising information about one or more updated RAN area configurations.

In certain embodiments, the request may further comprise an indication that the request is also associated with a tracking area update.

In certain embodiments, determining that the RAN area update has been triggered may be based on one or more of: the UE has entered a cell outside of a RAN area of the UE; and expiration of a RAN area update timer.

In certain embodiments, the indication that the request is associated with the RAN area update may comprise a cause value included in the request to resume the connection.

Also disclosed is a user equipment (UE). The UE comprises a receiver, a transmitter, and processing circuitry coupled to the receiver and the transmitter. The processing circuitry is configured to determine that a radio access network (RAN) area update has been triggered. The processing circuitry is configured to send, via the transmitter to a network node, a request to resume a connection, the request comprising an indication that the request is associated with the RAN area update. The processing circuitry is configured to receive, via the receiver from the network node, a connection suspend message, the connection suspend message comprising information about one or more updated RAN area configurations.

Certain embodiments of the present disclosure may provide one or more technical advantages. For example, certain embodiments may enable the UE to quickly return to RRC_INACTIVE state after a NAS procedure without having to fully enter RRC_CONNECTED state. This may advantageously reduce battery consumption by the UE, which leads to increased stand-by time of the UE, and reduce signaling (e.g., handover signaling, paging signaling, etc.) in the network. Reducing signaling may advantageously reduce consumption of radio resources (e.g., spectrum, power, processing, storage, etc.) in the network. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
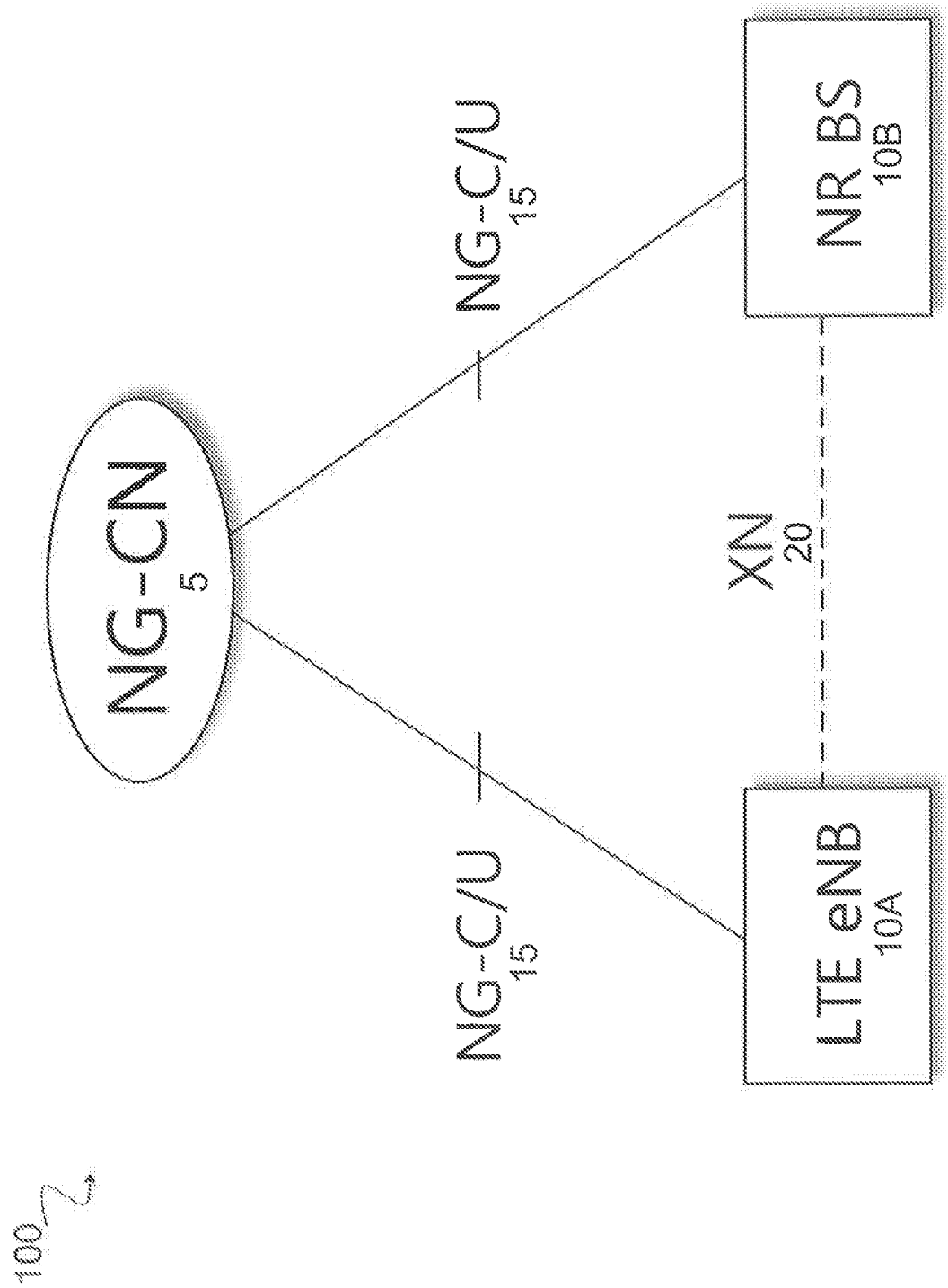
FIG. 1 illustrates an example of the high-level next-generation network architecture.
Figure 2:
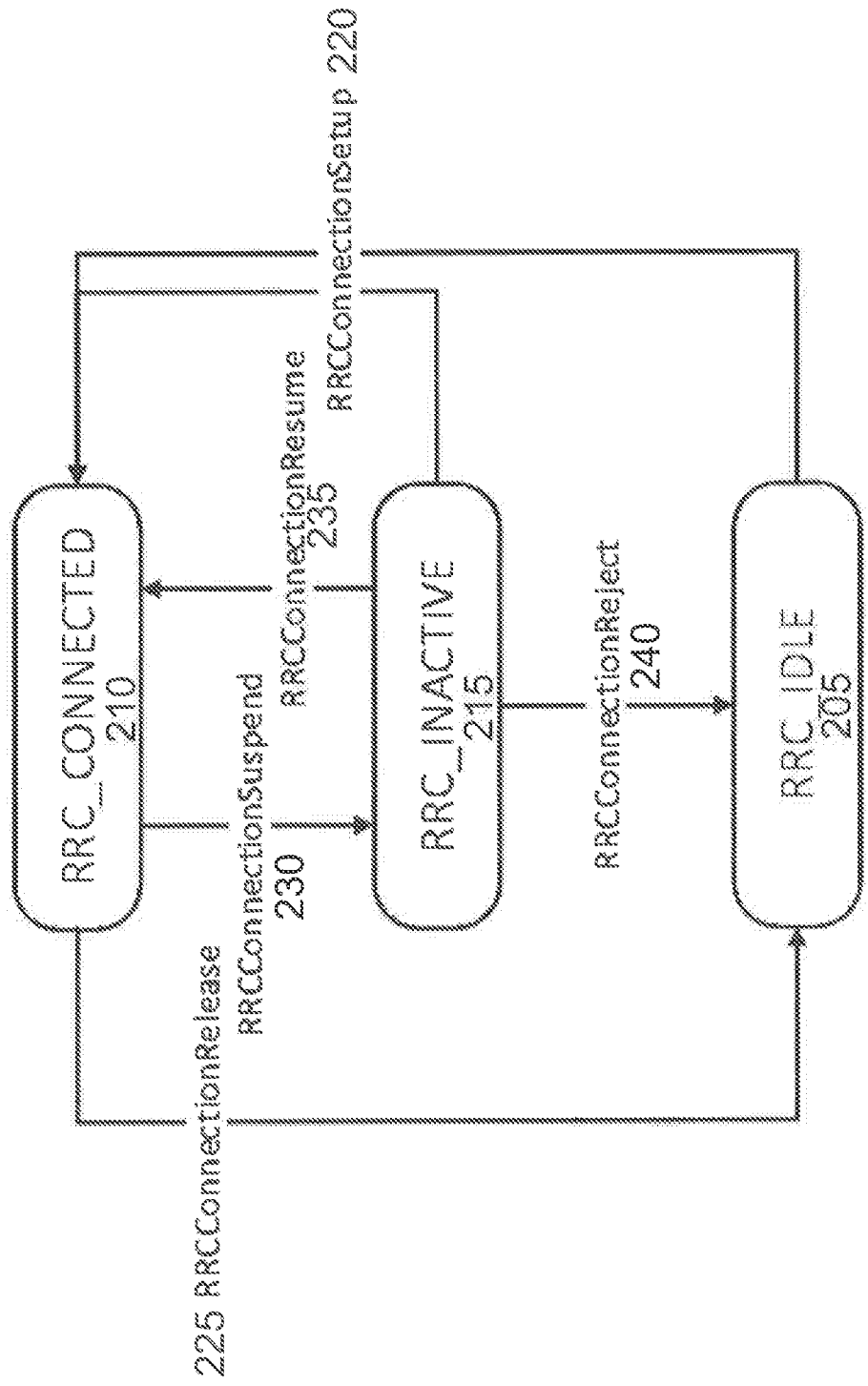
FIG. 2 illustrates the proposed state transitions for NR.
Figure 3:
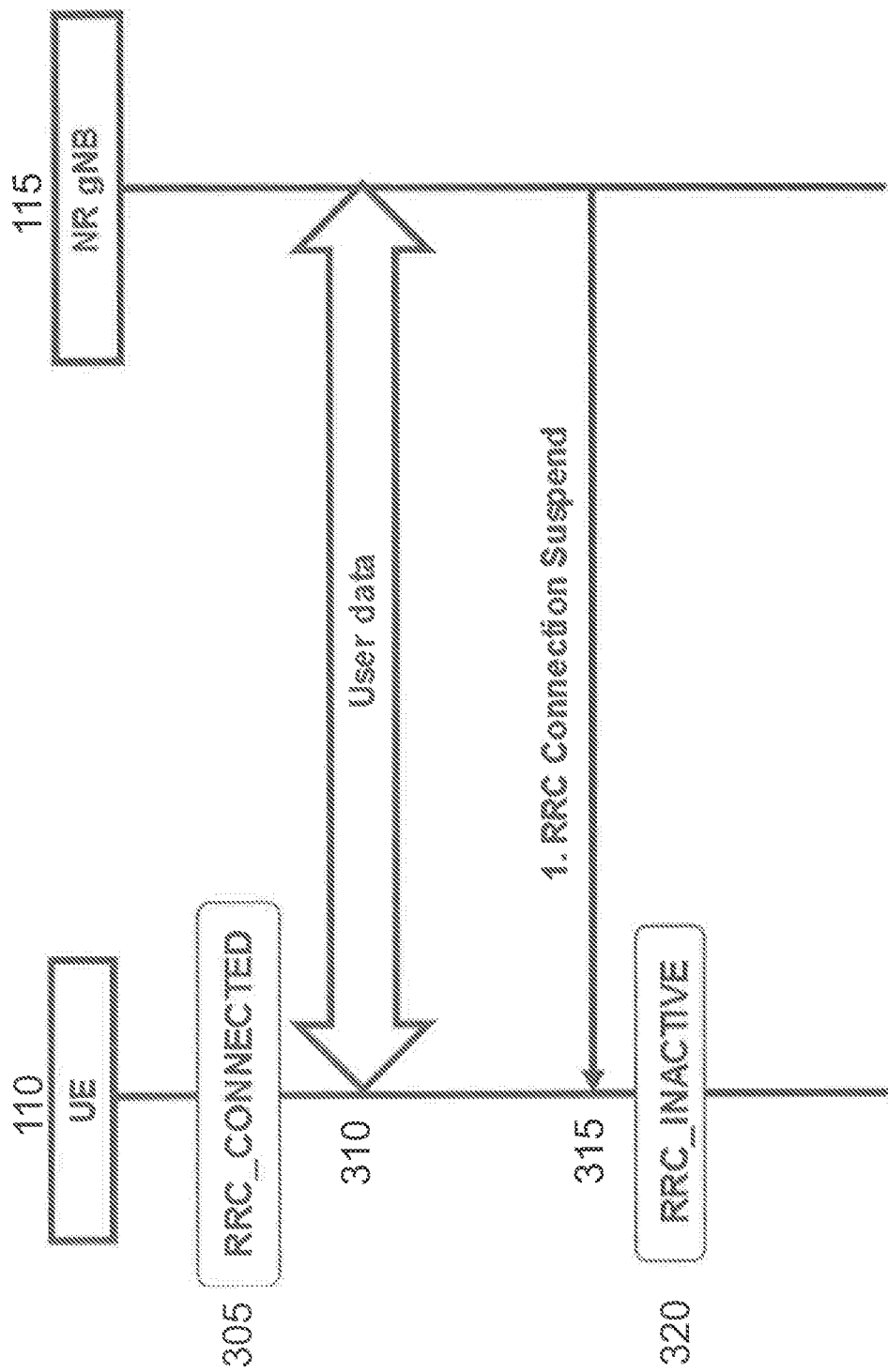
FIG. 3 is a signal flow diagram illustrating an example of a successful RRCConnectionSuspend procedure.
Figure 4:
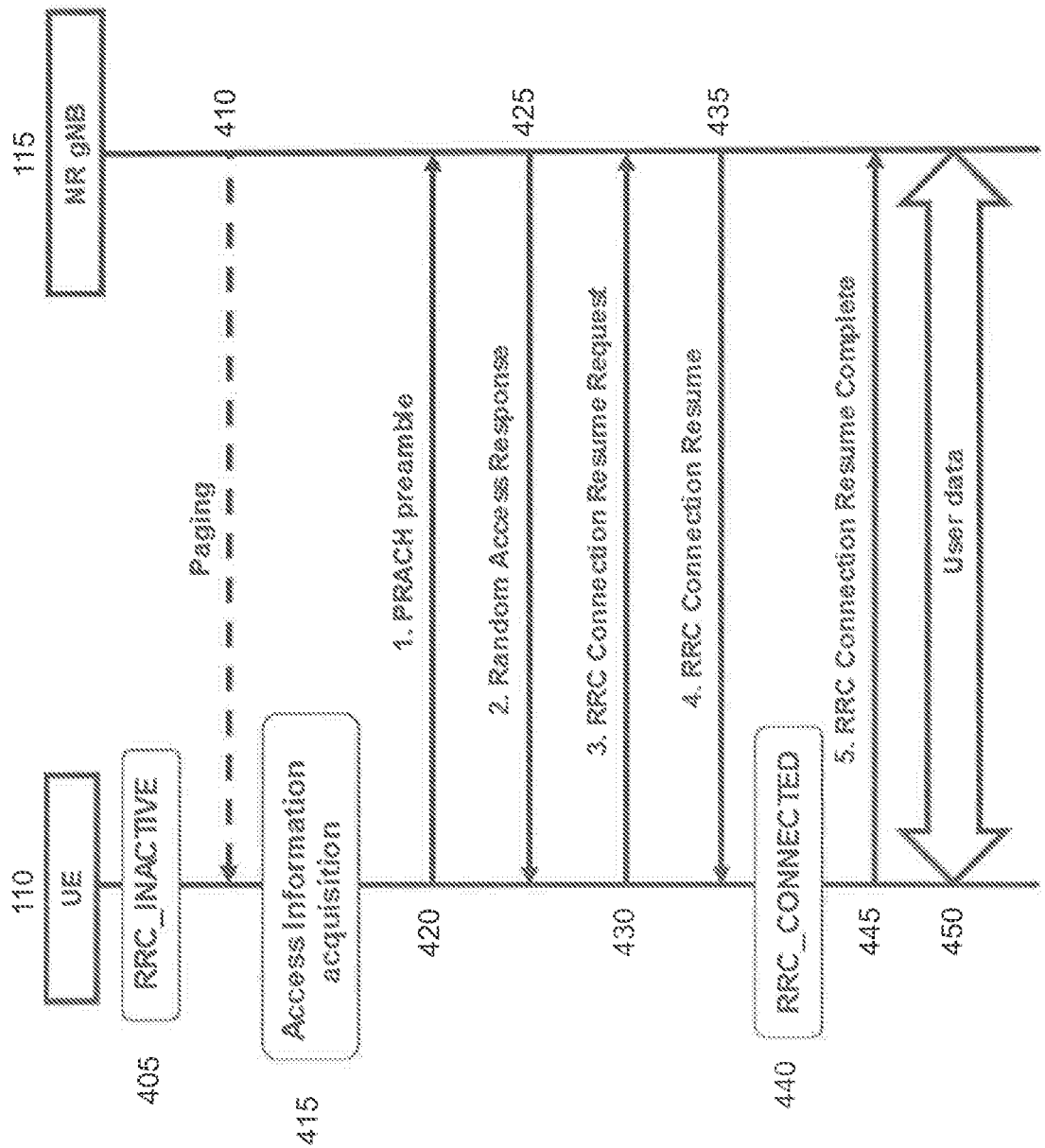
FIG. 4 is a signal flow diagram illustrating an example of a successful RRCConnectionResume procedure.

It has been agreed that a UE shall perform a TAU when in RRC_INACTIVE state while the RAN keeps the AS context and the CN/RAN connection (S1/NG-C) up. In this scenario, it means that the NAS signaling will be routed over the already existing CN/RAN connection, which also should be kept when the TAU procedure is complete. With the current approaches described above, however, there is no way for the RAN to know that the TAU procedure has been completed. If the UE includes the "mo-signalling" cause value in the RRCResumeRequest, the RAN may know that it is an NAS signaling procedure. It will not, however, know what NAS procedure it is (e.g., TAU, Protocol Data Unit (PDU) session activation, service activation, etc.) and it will not know when it has been completed. As a result, the RAN does not know when it should suspend the RRC connection again.

The present disclosure contemplates various embodiments that may address these and other deficiencies associated with existing approaches. For example, certain embodiments may advantageously enable a RAN node (e.g., eNB or gNB) to be informed when an NAS procedure (e.g., a TAU) has been completed (and, in some cases, the type of procedure being completed). In certain embodiments, this is achieved by enabling the AS layer to be able to determine when the NAS layer is finished with an NAS procedure when the UE is in RRC_INACTIVE state. For example, in certain embodiments the NAS layer in the UE may indicate to the RRC layer in the UE that it has received a message indicating that a NAS procedure has been completed (e.g., a TAU Complete message indicating that a TAU procedure has been completed). In such a scenario, the RRC layer in the UE will then transmit a message to the RRC layer in the RAN node indicating that the connection can be suspended. Advantageously, such an approach would also work using other protocol layers (e.g., Medium Access Control (MAC), Packet Data Convergence Protocol (PDCP), etc.). When the RAN node receives this indication, it can initiate the procedure to suspend (or, in some cases, release) the RRC connection.

As another example, in certain embodiments a core network node (e.g., an MME) may signal to the RRC layer in the RAN node (e.g., eNB or gNB) using a "end-of-transmission" when it has sent a message indicating that the NAS procedure has been completed (e.g., the TAU Complete message). In some cases, this information element (IE) may be transferred in the signaling protocol headers used over the S1 or NG-C interfaces (e.g., S1-AP or NG-C-AP protocols). If the UE has no other ongoing traffic (e.g., UP traffic), the RAN node can then decide to suspend the UE to RRC_INACTIVE by transmitting an RRC_Suspend message to the UE. As another example, in certain embodiments the RAN node may decide by itself when it thinks the NAS signaling is finished based on one or more criteria (e.g., based on statistics of CN/RAN signaling in RRC_INACTIVE or based on an internal RAN timer).

In certain embodiments, the TAU Complete NAS message may be included in the RRC_Suspend message. In certain embodiments, the RRC_Suspend message may be sent after the TAU Complete message is sent to the IE. In certain embodiments, a new timer may be introduced where the RAN node awaits any CN responses to the "TAU Request" or any indication from the UE that the procedure is completed. It the timer times out, the RAN node may suspend the UE context even if it has not received an explicit indication that the procedure is completed. In certain embodiments, the UE or CN provides additional information to the RAN about the nature or type of NAS procedure currently being executed (e.g., if it is a TAU, or Attach procedure, or Registration procedure, Authentication procedure, etc.). This information may be used by the RAN node to determine when the UE context should be suspended.

According to one example embodiment, a method in a UE is disclosed. The UE initiates, while the UE is configured in an inactive state, resumption of a connection with a network node prior to completing a NAS procedure. The IE determines that signaling associated with the NAS procedure is complete. The UE sends a message to the network node, the message indicating that the signaling associated with the NAS procedure is complete.

According to another example embodiment, a method in a core network node (e.g., an MME) is disclosed. The core network node performs a NAS procedure associated with a UE (e.g., a UE). The core network node sends, to a network node, an indication that signaling associated with the NAS procedure is complete.

According to another example embodiment, a method in a network node (e.g., an eNB or gNB) is disclosed. The network node receives, from a UE configured in an inactive state, a request to resume a connection as part of a NAS procedure. The network node resumes the connection in response to the request. The network node obtains an indication that signaling associated with the non-access stratum procedure is complete.

According to another example embodiment, a method in a UE is disclosed. The UE determines that a RAN area update has been triggered. The UE sends, to a network node, a request to resume a connection, the request comprising an indication that the request is associated with the RAN area update. The UE receives, from the network node, a connection suspend message, the connection suspend message comprising information about one or more updated RAN area configurations.

Certain embodiments of the present disclosure may provide one or more technical advantages. For example, certain embodiments may enable a UE to quickly return to RRC_INACTIVE state after an NAS procedure without having to fully enter RRC_CONNECTED state. This may advantageously reduce battery consumption by the UE, which leads to increased stand-by time of the UE, as well as reduce signaling (e.g., handover signaling, paging signaling, etc.) in the network. Reducing signaling may advantageously reduce consumption of radio resources (e.g., spectrum, power, processing, storage, etc.) in the network. Other advantages may be readily apparent to one having skill in the art. Certain embodiments may have none, some, or all of the recited advantages.

Figure 5:
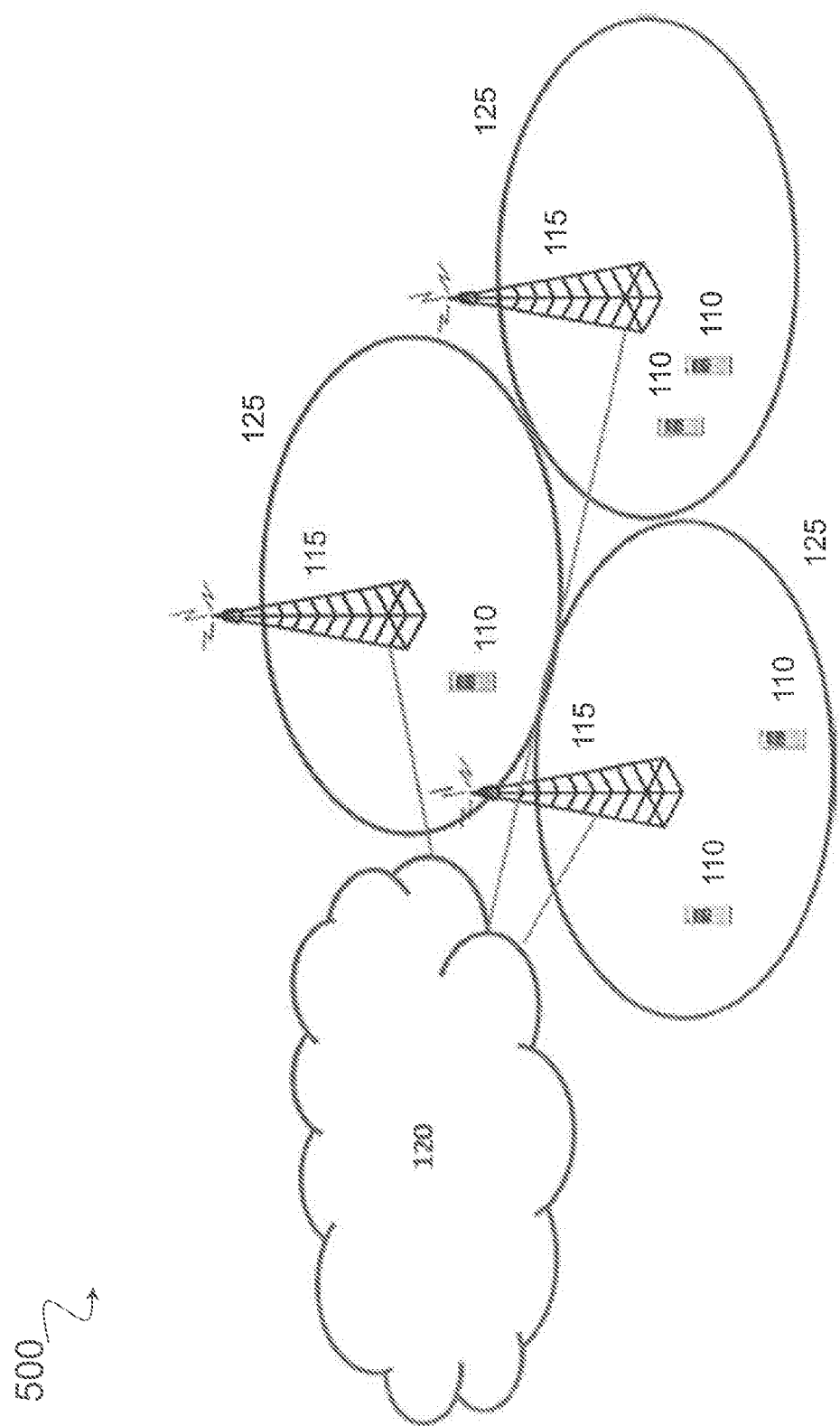
FIG. 5 is a block diagram illustrating an embodiment of a network, in accordance with certain embodiments.

FIG. 5 is a block diagram illustrating an embodiment of a network 500, in accordance with certain embodiments. Network 500 includes one or more UE(s) 110 (which may be interchangeably referred to as wireless devices 110) and one or more network node(s) 115 (e.g., gNBs or eNBs). UEs 110 may communicate with network nodes 115 over a wireless interface. For example, a UE 110 may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell 125. In some embodiments, UEs 110 may have device-to-device (D2D) capability. Thus, UEs 110 may be able to receive signals from and/or transmit signals directly to another UE.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network 120. Interconnecting network 120 may refer to any interconnecting system capable of transmitting audio, video, signals, data, messages, or any combination of the preceding. Interconnecting network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for UEs 110. UEs 110 may exchange certain signals with the core network node using the NAS layer. In NAS signaling, signals between UEs 110 and the core network node may be transparently passed through the radio access network. In certain embodiments, network nodes 115 may interface with one or more network nodes over an internode interface, such as, for example, an X2 interface.

As described above, example embodiments of network 500 may include one or more wireless devices 110, and one or more different types of network nodes capable of communicating (directly or indirectly) with wireless devices 110.

In some embodiments, the non-limiting term UE is used. UEs 110 described herein can be any type of wireless device capable of communicating with network nodes 115 or another UE over radio signals. UE 110 may also be a radio communication device, target device, D2D UE, machine-type-communication (MTC) UE or UE capable of machine-to-machine communication (M2M), low-cost and/or low-complexity UE, a sensor equipped with UE. Tablet, mobile terminals, smart phone, laptop embedded equipped (LEE), laptop mounted equipment (LME), USB dongles, Customer Premises Equipment (CPE) etc. UE 110 may operate under either normal coverage or enhanced coverage with respect to its serving cell. The enhanced coverage may be interchangeably referred to as extended coverage. UE 110 may also operate in a plurality of coverage levels (e.g., normal coverage, enhanced coverage level 1, enhanced coverage level 2, enhanced coverage level 3 and so on). In some cases, UE 110 may also operate in out-of-coverage scenarios.

Also, in some embodiments generic terminology, "network node" is used. Network nodes 115 described herein can be any kind of network node, which may comprise a BS, radio BS, Node B, multi-standard radio (MSR) radio node such as MSR BS, evolved Node B (eNB), gNB, network controller, RNC, base station controller (BSC), relay node, relay donor node controlling relay, base transceiver station (BTS), access point (AP), radio AP, transmission points, transmission nodes, Remote Radio Unit (RRU), Remote Radio Head (RRH), nodes in distributed antenna system (DAS), Multi-cell/multicast Coordination Entity (MCE), core network node (e.g., Mobile Switching Center (MSC), Mobility Management Entity (MME), etc.), Operations and Management (O&M), Operations Support System (OSS), Self-Organizing Network (SON), positioning node (e.g., Evolved Serving Mobile Location Center (E-SMLC)), Minimization of Drive Test (MDT), or any other suitable network node.

The terminology such as network node and UE should be considered non-limiting and does in particular not imply a certain hierarchical relation between the two; in general a network node could be considered as device 1 and a "UE" device 2, and these two devices communicate with each other over some radio channel.

Example embodiments of UE 110, network nodes 115, and other network nodes (such as radio network controller or core network node) are described in more detail below with respect to FIGS. 11-15.

Although FIG. 5 illustrates a particular arrangement of network 500, the present disclosure contemplates that the various embodiments described herein may be applied to a variety of networks having any suitable configuration. For example, network 500 may include any suitable number of UEs 110 and network nodes 115, as well as any additional elements suitable to support communication between UEs or between a UE and another communication device (such as a landline telephone). Furthermore, although certain embodiments may be described as implemented in an LTE network, the embodiments may be implemented in any appropriate type of telecommunication system supporting any suitable communication standards (including 5G standards) and using any suitable components, and are applicable to any radio access technology (RAT) or multi-RAT systems in which a UE receives and/or transmits signals (e.g., data). For example, the various embodiments described herein may be applicable to NR, 5G, LTE, LTE-Advanced. Universal Mobile Telecommunications System (UMTS), High Speed Packet Access (HSPA), Global System for Mobile Communications (GSM), cdma2000, WCDMA, Worldwide Interoperability for Microwave Access (WiMax), UMB, WiFi, another suitable RAT, or any suitable combination of one or more RATs. Thus, network 500 may represent any type of communication, telecommunication, data, cellular, and/or radio network or other type of system. In particular embodiments, the network 100 may be configured to operate according to specific standards or other types of predefined rules or procedures.

Although certain embodiments may be described in the context of wireless transmissions in the DL, the present disclosure contemplates that the various embodiments are equally applicable in the uplink (UL) or sidelink.

As described above, it has been agreed that UEs 110 (e.g., UE 110A) shall perform a TAU when in RRC_INACTIVE state while the RAN (e.g., a network node 115, such as network node 115A) keeps the AS context and the CN/RAN connection (S1/NG-C) up. In this scenario, it means that the NAS signaling will be routed over the already existing CN/RAN connection, which also should be kept when the TAU procedure is complete. According to existing approaches, however, there is no way for network node 115A to know that the TAU procedure has been completed. If UE 110A includes the "mo-signalling" cause value in the RRCResumeRequest, network node 115A may know that it is an NAS signaling procedure. Network node 115A will not, however, know what NAS procedure it is (e.g., TAU, Protocol Data Unit (PDU) session activation, service activation, etc.) and will not know when it has been completed. As a result, network node 115A does not know when it should suspend the RRC connection again.

The present disclosure contemplates various embodiments that may address these and other deficiencies associated with existing approaches. As described in more detail below, when UE 110A in an inactive state (e.g., RRC_INACTIVE state) performs an NAS procedure (e.g., a TAU), the RRC layer in UE 110A can determine when the NAS signaling is finished so that UE 110 can re-suspend the RRC_CONNECTION (i.e., enter RRC_INACTIVE state again) to save battery power. The various embodiments described herein may apply to scenarios where UE 110A is configured in RRC_INACTIVE state (or another similar state) while the RAN keeps an AS context and the CN/RAN connection is active. In this case, the CN is unaware that the UE is in RRC_INACTIVE as it is in CN_CONNECTED.

In certain embodiments, UE 110A may initiate, while UE 110A is configured in an inactive state, resumption of a connection with network node 115A prior to completing an NAS procedure. In certain embodiments, the inactive state may be RRC_INACTIVE state. In certain embodiments, the inactive state may be another state sharing similar characteristics as RRC_INACTIVE state (e.g., a substantially equivalent state in another RAT). For purposes of illustration, the various embodiments described below in relation to FIG. 5 use RRC_INACTIVE state as an example. The present disclosure, however, is not limited to such an example. Rather, the present disclosure contemplates that the various embodiments described herein may be applicable to other states sharing similar characteristics of RRC_INACTIVE state regardless of the nomenclature used (e.g., idle state, sleep state, dormant state, inactive state, etc.).

For example, UE 110A may send a request to resume a connection to network node 115A as part of an NAS procedure, which is received by network node 115A. In certain embodiments, UE 110A may receive, from network node 115A, a connection resume message (e.g., in response to the request to resume the connection). In certain embodiments, the request to resume the connection may include an indication of a type of NAS procedure being performed by UE 110A. Network node 115A resumes the connection in response to the request received from UE 110A.

The NAS procedure may be any suitable type of NAS procedure. For example, in certain embodiments, the NAS procedure may be one of a TAU; an attach procedure; a registration procedure; a PDU session activation; and an authentication procedure. Although certain embodiments may be described herein using a TAU as an example of an NAS procedure, the present disclosure is not limited to such an example. Rather, the present disclosure contemplates that the various embodiments described herein are equally applicable to other types of NAS procedures.

For purposes of illustration, assume that the NAS procedure to be performed by UE 110A is a TAU. In some cases, one or more conditions may be fulfilled which trigger UE 110A to initiate resumption of the connection with network node 115A. As one example, the TAU may be triggered by UE 110A detecting that it has entered a new TA that is not in the list of TAs that UE 110A registered with network 500.

As another example, the TAU may be triggered when the periodic TAU timer has expired. These triggering conditions are described in more detail in 3GPP TS 23.401.

When UE 110A performs a TAU, the NAS layer in the UE will generate a "TAU Request" message which the lower layers (i.e., AS) will transmit transparently to the network. For example, UE 110A may send a TAU Request message to network node 115A, which may then send the TAU Request message to a core network node (e.g., an MME). More particularly, the NAS layer in UE 110A will send an indication to the RRC in UE 110A that the message is a TAU. The RRC layer in UE 110A will send a RRCResumeRequest message with a cause value equal to TAU to network node 115A. Network node 115A then responds with a RRCConnectionResume message, and UE 110A responds with the TAU Request message, which is forwarded to the core network node. The reason the "TAU Request" is not included in the RRCResumeRequest message is because that is limited in size. In certain embodiments, UE 110A may send another message to network node 115A, after initiating the non-access stratum procedure, indicating that the NAS procedure has started or is ongoing.

The core network node performs the NAS procedure associated with UE 110A (in this example, a TAU). In certain embodiments, the core network node may send a message to network node 115A, after the NAS procedure has been initiated, indicating that the NAS procedure has started or is ongoing. When the core network node (e.g., MME) (and the rest of the CN) has finished with the TAU, it sends a TAU Accept message to UE 110A indicating that the TAU procedure has been completed. UE 110A receives the TAU Accept message.

Network node 115A obtains an indication that signaling associated with the NAS procedure is complete. Network node 115A may obtain the indication in any suitable manner. In certain embodiments, network node 115A may obtain the indication that signaling associated with the NAS procedure is complete by determining that signaling associated with the NAS procedure is complete based on statistical information related to NAS procedures. In such a scenario, network node 115A may autonomously determine when it thinks the procedure has been completed (e.g., based on statistics of previous or similar RAN/CN communication in RRC_INACTIVE). In some cases, however, the procedure may not in fact have been completed (meaning that new DL NAS signaling is sent), network node 115A would need to page UE 110A over the complete RAN tracking area in order to be able to deliver the NAS signaling.

In certain embodiments, network node 115A may obtain the indication that signaling associated with the non-access stratum procedure is complete by initiating a timer, and, in response to the timer expiring, determining that the signaling associated with the non-access stratum procedure is complete. For example, network node 115A may have an inactive timer enabling network node 115A to release signaling connection of UE 110A and suspend the RRC connection when the timer times out. The timer may have any suitable duration. In certain embodiments, the timer may be optimized so that it is neither too long nor too short. If it is too long. UE 110A will unnecessary keep the signaling connection for too long a time, which may lead to increased battery consumption by UE 110A. If it is too short, however, there is a risk that the NAS procedure will not have been completed, which could lead to the need for network node 115A to perform paging. Such an approach may be useful to handle error cases when other approaches described herein are used.

In certain embodiments, network node 115A may obtain the indication that signaling associated with the NAS procedure is complete by receiving, from one or both of the core network node and UE 110A, the indication that the signaling associated with the NAS procedure is complete. In other words, the core network node or UE 110A may signal to network node 115A when the NAS signaling is finished. The indication that the signaling associated with the NAS procedure is complete may be received from at least one of: a non-access stratum layer of the core network node; and a non-access stratum layer of UE 110A. In some cases, the indication that the signaling associated with the non-access stratum procedure is complete may be included in a message that is part of the NAS procedure. In some cases, the indication that the signaling associated with the non-access stratum procedure is complete may be included in a separate message that is not a part of the non-access stratum procedure.

For example, in certain embodiments UE 110A may determine that signaling associated with the NAS procedure is complete (e.g., by obtaining, at the RRC layer of UE 110A, an indication from a NAS layer of UE 110A that UE 110A has received the TAU accept message), and send a message to network node 115A indicating that the signaling associated with the non-access stratum procedure is complete. For example, a RRC layer of UE 110A may transmit the message to a RRC layer of network node 11A.

As another example, the core network node may send, to network node 115A, an indication that signaling associated with the NAS procedure is complete. In the example case where the NAS procedure is a TAU, the indication that signaling associated with the NAS procedure is complete may sent in a variety of ways. As one example, in certain embodiments the indication that signaling associated with the TAU procedure is complete may be the TAU accept message. In certain embodiments, the indication that signaling associated with the TAU procedure is complete may be a signal from a NAS layer of the core network node. The signal from the NAS layer of the core network node may be sent in any suitable manner. As one example, the signal from the NAS layer of the core network node may be sent as part of an S1 or NG-C message used to carry the TAU accept message. As another example, the signal from the NAS layer of the core network node may be sent separate from an S1 or NG-C message used to carry the TAU accept message.

As the NAS in the core network node or UE 110A is unaware of any AS activity and the RRC state, this indication should be included whenever the NAS is finished with a specific signaling and there is no other signaling expected. This means that the indication would be sent whenever any NAS procedure (e.g., TAU procedure) is completed, regardless if UE 110A is actively sending data or performing a NAS procedure triggered from RRC_INACTIVE state. An additional advantage of providing this indication for any NAS procedure is that it gives information to the AS layer in network node 115A as to whether any NAS procedure is completed. This information can be used by network node 115A (in some cases together with other information, such as information about data activity for UE 110A) to determine when it is a good time to either suspend the UE context (to RRC_INACTIVE state) or to release the UE context (to RRC_IDLE state), and thereby optimize battery consumption and performance.

Additionally, as described above, in certain embodiments the core network node or UE 110A may inform network node 115A using either RRC or S1 or NG-C signaling that a NAS procedure has started or is ongoing. In this way, network node 115A can choose not to suspend the UE context (to RRC_INACTIVE state) or to release the UE context (to RRC_IDLE state) until it gets another indication that the NAS procedure has been completed.

Thus, in response to obtaining the indication that signaling associated with the NAS procedure is complete, in certain embodiments network node 115A may perform a variety of operations. As one example, network node 115A may suspend the connection. In such a scenario, UE 110A may receive, from network node 115A, in response to sending the message indicating that the signaling associated with the NAS procedure is complete, an instruction to suspend the connection (e.g., by sending an RRC_Suspend message to UE 110A). As another example, network node 115A may release the connection (e.g., by sending an RRC_Release message to UE 110A). The delivery of the RRC_Suspend message or RRC_Release message can be performed in a variety of ways. For example, the RRC_Suspend message or RRC_Release message can be sent as a separate RRC message after the delivery of the TAU Accept message (or other final NAS message). As another example, the instruction to suspend or release the connection can be delivered in conjunction with the NAS message (e.g., TAU Accept message), as part of the same RRC message. These example embodiments are described in more detail below in relation to FIGS. 8 and 9.

In certain embodiments, UE 110A may also be instructed to perform RAN area updates when entering an area outside its configured RAN area. As the RAN based notification area is currently being standardized, the procedures for RAN area updates are not settled. The present disclosure contemplates that RAN area updates may be performed in a variety of ways. As one example, in certain embodiments when a RAN area update is triggered while UE 110A is in RRC_IDLE state (e.g., by UE 110A entering a cell outside the RAN area, or a RAN area update timer expires), UE 110A may transmit a RRCConnectionResumeRequest message. In such a case, network node 115A may respond with a RRCConnection-Resume message (i.e., UE 110A enters RRC_CONNECTED state). Once UE 110A is in RRC_CONNECTED, network node 115A can decide to suspend UE 110A to RRC_INACTIVE again (e.g., after some inactivity).

As another example, in certain embodiments when a RAN area update is triggered while UE 110A is in RRC_IDLE state (e.g., as described above), UE 110A may transmit a RRCConnectionResumeRequest message with a new flag (e.g., RAN area update flag). The network then responds with a RRCConnectionSuspend message with updated RAN area configurations.

In certain embodiments, these approaches for RAN area updates can be combined with the approaches for NAS procedures (e.g., TAUs) described herein. For example, in certain embodiments when network node 115A detects that UE 110A is performing a NAS layer TAU, network node 115A can decide to also update the RAN area. As another example, signalling to network node 115A regarding RAN area update and TAU can be carried in the same RRC message, making it a combined RAN area and TAU procedure. As another example, a RRC message flag indicating a combined RAN area and TAU may be used.

Thus, in certain embodiments, UE 110A may determine that a RAN area update has been triggered. For example, UE 110A may determine that the RAN area update has been triggered based on one or more of: the UE has entered a cell outside of a RAN area of the UE; and expiration of a RAN area update timer. As another example, UE 110A may receive an instruction from network node 115A to perform a RAN area update. For example, network node 115A may determine that the NAS procedure is a TAU, and in response to determining that the non-access stratum procedure is a TAU, instruct UE 110A to perform a RAN area update.

In such a scenario, UE 110A may send, to network node 115A, a request to resume a connection as described above. The request may include an indication that the request is associated with the RAN area update. In certain embodiments, the indication that the request is associated with the RAN area update may be a cause value included in the request to resume the connection. In certain embodiments, the request may also include an indication that the request is also associated with a tracking area update. UE 110A may receive, from network node 115A, a connection suspend message, the connection suspend message comprising information about one or more updated RAN area configurations.

The various embodiments described above in relation to FIG. 5 are described in more detail in relation to FIGS. 6-10 below. Although FIGS. 6-10 describe example embodiments using a TAU as an example NAS procedure, the various embodiments described herein are not limited to such an example. Rather, the present disclosure contemplates that the various embodiments described herein are applicable to any suitable NAS procedure (e.g., TAU, an attach procedure, a registration procedure, a PDU session activation, an authentication procedure, etc.). Additionally, although the example embodiments of FIGS. 6-10 are described in relation to a UE configured in RRC_INACTIVE state, the present disclosure is not limited to such an example. Rather, the present disclosure contemplates that the various embodiments described herein may be applicable to other states sharing similar characteristics regardless of the nomenclature used (e.g., idle state, sleep state, dormant state, inactive state, etc.).

Figure 6:
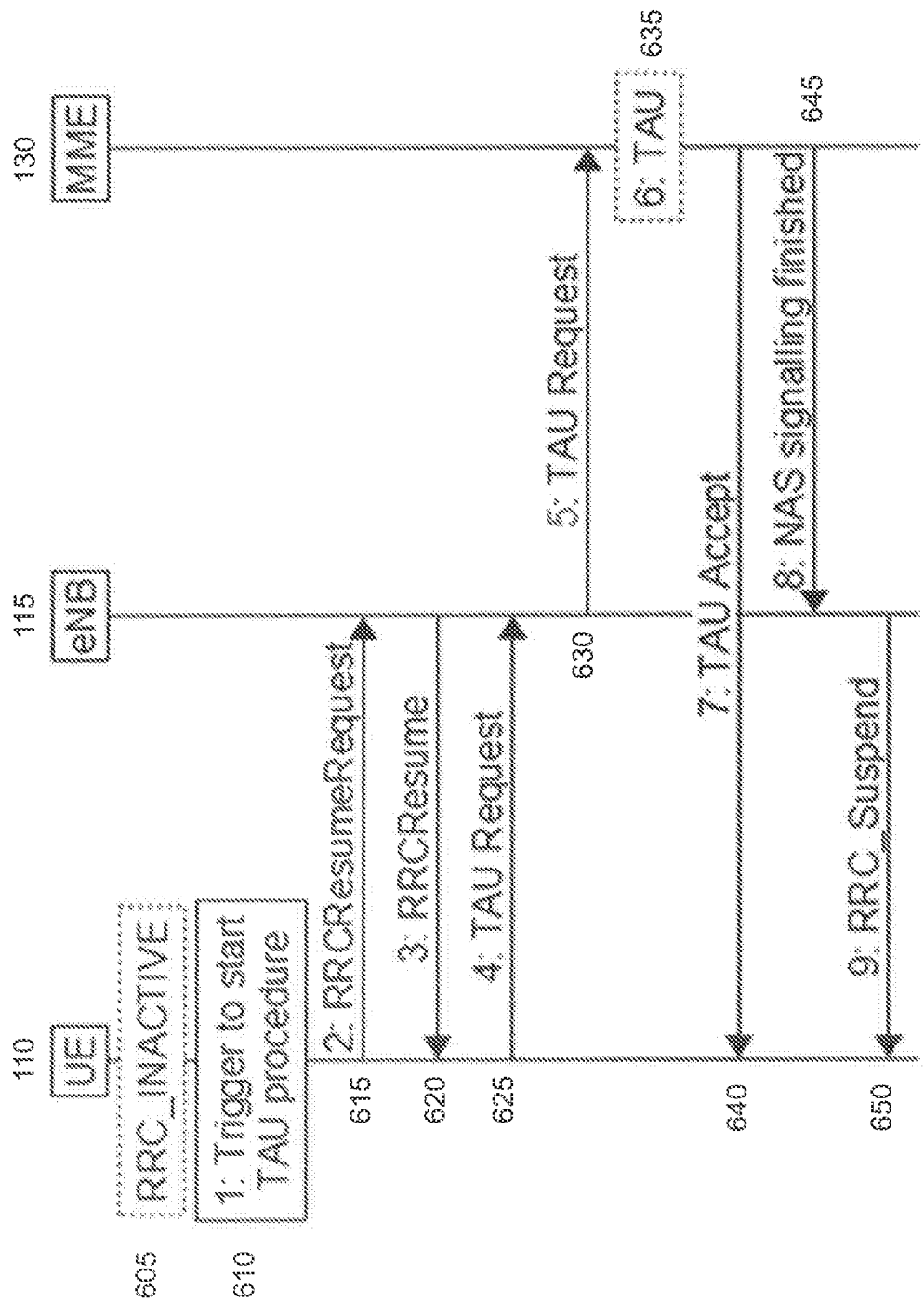
FIG. 6 is a signal flow diagram illustrating an example TAU in RRC_INACTIVE state where the NAS in the core network node indicates to the AS in the network node that the signaling is finished, in accordance with certain embodiments.

FIG. 6 is a signal flow diagram illustrating an example TAU in RRC_INACTIVE state where the NAS layer in the core network node indicates to the AS in the network node that signaling is finished, in accordance with certain embodiments. More particularly, FIG. 6 illustrates an exchange of signals between a UE 110, a network node 115 (an eNB in the example of FIG. 6), and a core network node 130 (an MME in the example of FIG. 6). At step 605, UE 110 is in RRC_INACTIVE state. At step 610, UE 110 is triggered to start a TAU procedure (e.g., as described above in relation to FIG. 5). At step 615, UE 110 sends a RRCResumeRequest to network node 115 to initiate resumption of a connection. At step 620, network node 115 sends a RRCResume message to UE 110 as part of resuming the connection.

At step 625, UE 110 sends a TAU Request to network node 115. At step 630, network node 115 forwards the TAU Request to core network node 130. At step 635, core network node 130 performs the TAU procedure associated with UE 110. In certain embodiments, core network node 130 may send a message to network node 115, after the NAS procedure has been initiated, indicating that the NAS procedure has started or is ongoing.

At step 640, core network node 130 sends a TAU Accept message to UE 110. The TAU Accept message provides an indication to UE 110 that signaling associated with the NAS procedure is completed. At step 645, core network node 130 sends a message to network node 115 indicating that signaling associated with the NAS procedure has finished. As described above, the signaling can, in the case it is from the core network node, be sent as part of the S1 and NG-C message used to carry the NAS TAU accept message, or it can be a separate S1 and NG-C message. Alternatively, the TAU Accept message may be used by core network node 130 to provide an indication to network node 115 that the signaling associated with the NAS procedure is complete. At step 650, network node 115 sends an RRC_Suspend message to UE 110.

In certain embodiments, the message from core network node 130 indicating that signaling associated with the NAS procedure has finished may only be sent if there are no other NAS signaling on the way. In some cases, it can also be limited to only being sent if the NAS signaling were a TAU. If the RRC layer of network node 115 receives the message indicating that signaling associated with the NAS procedure has finished when the UE is in RRC_CONNECTED, network node 115 does not need to release or suspend the UE context. Network node 115 can, however, use this information (in some cases together with other information, such traffic or mobility information of UE 110) in the evaluation when to release the UE context.

Figure 7:
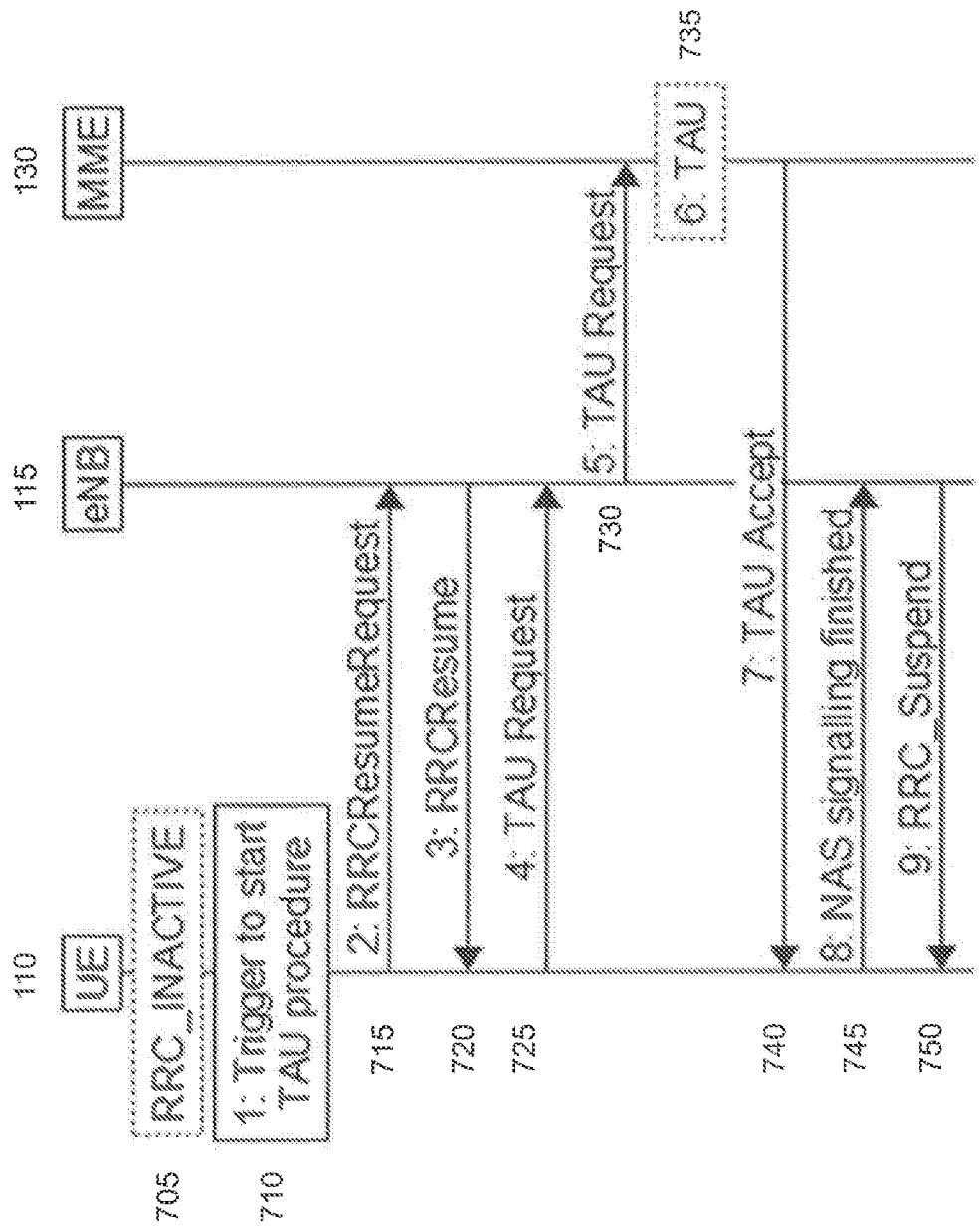
FIG. 7 is a signal flow diagram illustrating an example TAU in RRC_INACTIVE state where the NAS in the UE indicates to the AS in the network node that the signaling is finished, in accordance with certain embodiments.

FIG. 7 is a signal flow diagram illustrating an example TAU in RRC_INACTIVE state where the NAS in the UE indicates to the AS in the network node that the signaling is finished, in accordance with certain embodiments. Similar to FIG. 6 described above, FIG. 7 illustrates an exchange of signals between UE 110, network node 115 (an eNB in the example of FIG. 7), and core network node 130 (an MME in the example of FIG. 7). At step 705, UE 110 is in RRC_INACTIVE state. At step 710, UE 110 is triggered to start a TAU procedure (e.g., as described above in relation to FIG. 5). At step 715, UE 110 sends a RRCResumeRequest message to network node 115 to initiate resumption of the connection with network node 115 prior to completing the TAU procedure. At step 725, network node 115 sends a RRCResume message to UE 110 as part of resuming the connection.

At step 725, UE 110 sends a TAU Request to network node 115. At step 730, network node 115 forwards the TAU Request to core network node 130. At step 735, core network node 130 performs the TAU procedure associated with UE 110. At step 740, core network node 130 sends a TAU Accept message to UE 110. UE 110 may determine, based on the received TAU Accept message, that signaling associated with the NAS procedure is complete.

In contrast to the example embodiment of FIG. 6 described above, at step 745, UE 110 sends a message to network node 115 indicating that signaling associated with the NAS procedure is complete. In such a scenario (where the indication that the signaling associated with the NAS procedure is complete comes from UE 110), the message can be sent using RRC. At step 750, network node 115 sends an RRC_Suspend message to UE 110.

According to an alternative embodiment to those illustrated in FIGS. 6 and 7, network node 115 may itself detect that the NAS message from core network node 130 to UE 110 is an TAU Accept (or any other last NAS message), and thus use this information to determine that the NAS signaling is complete and that the UE can be suspended.

As the NAS in core network node 130 or UE 110 is unaware of any AS activity and the RRC state, this indication will have to be included whenever NAS is finished with a specific signaling and there is no other signaling expected. This means that the indication would be sent whenever any NAS procedure is completed, regardless if UE 110 is actively sending data or performing a NAS procedure triggered from RRC_INACTIVE state. An additional advantage of sending this indication for any NAS procedure is that it gives information to the AS layer in in network node 115 if any NAS procedure is completed. This information can be used (in some cases together with other information, such information about data activity for UE 110), to decide on when it is a good time to either suspend the UE context (to RRC_INACTIVE state) or to release the UE context (to RRC_IDLE state), and thereby optimize battery consumption and performance. Additionally, in certain embodiments core network node 130 or UE 110 may inform the network node 115 using either RRC or S1 or NG-C signaling that a NAS procedure has started or is ongoing. In this way, network node 115 can choose not to suspend the UE context (to RRC_INACTIVE state) or to release the UE context (to RRC_IDLE state) until it gets another indication that the NAS procedure has been completed.

As described above, the delivery of the RRC Suspend message or RRC Release message can be performed either as a separate RRC message after the delivery of the TAU accept message (or other final NAS message) or it can be delivered as in conjunction of the NAS message (e.g. TAU request), as part of the same RRC message. This is described in more detail below in relation to FIGS. 8 and 9.

Figure 8:
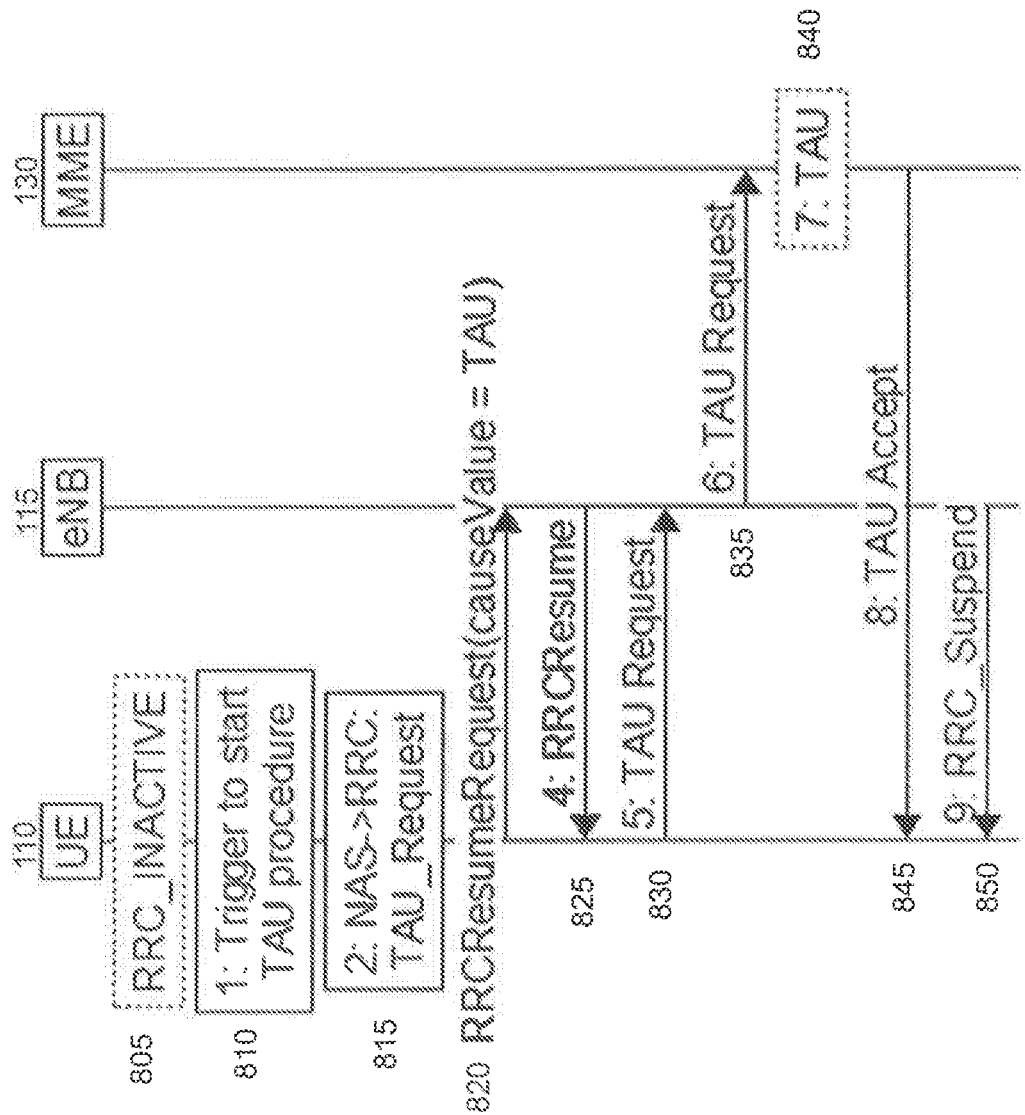
FIG. 8 is a signal flow diagram illustrating an example TAU in RRC_INACTIVE state to suspend after the TAU is finished, in accordance with certain embodiments.

FIG. 8 is a signal flow diagram illustrating an example TAU in RRC_INACTIVE state to suspend after the TAU is finished, in accordance with certain embodiments. Similar to FIGS. 6 and 7 described above, FIG. 8 illustrates an exchange of signals between UE 110, network node 115 (an eNB in the example of FIG. 8), and core network node 130 (an MME in the example of FIG. 8). At step 805, UE 110 is in RRC_INACTIVE state. At step 810, UE 110 is triggered to start a TAU procedure (e.g., as described above in relation to FIG. 5). In contrast to the examples of FIGS. 6 and 7 described above, at step 815 UE 110 determines what type of NAS procedure is being performed. In the example of FIG. 8, UE 110 determines that the NAS procedure is a TAU Request (in certain embodiments, the NAS procedure may be a different procedure from a TAU update, such as one of the NAS procedures described above in relation to FIG. 5). At step 820, UE 110 sends a RRCResumeRequest message to network node 115 to initiate resumption of the connection. In the example embodiment of FIG. 8, the RRCResumeRequest message includes a causeValue indicating that the NAS procedure is a TAU procedure. The causeValue informs network node 115 that an NAS procedure (specifically, a TAU procedure) has started or is ongoing. In this way, network node 115 can choose not to suspend the UE context (to RRC_INACTIVE state) or to release the UE context (to RRC_IDLE state) until it gets another indication that the NAS procedure has been completed. At step 825, network node 115 sends a RRCResume message to UE 110 as part of resuming the connection.

At step 830, UE 110 sends a TAU request to network node 115. At step 835, network node 115 sends the TAU Request to core network node 130. At step 840, core network node 130 performs the TAU procedure associated with UE 110. At step 845, core network node 130 sends a TAU Accept message to UE 110. In the example of FIG. 8, the indication to network node 115 that NAS signaling associated with the TAU is complete may be provided to network node 115 in a variety of ways. As one example, the TAU Accept message itself may provide an indication to network node 115 that NAS signaling associated with the TAU is complete, and thus network node 115 can determine whether to suspend or release the connection. As another example, an indication that NAS signaling associated with the TAU is complete may be transferred together with the TAU Accept message. In such a scenario, the TAU Accept message may be encapsulated in, for example, an S1 or NG message between core network node 130 and network node 115. The S1 or NO message may also carry an indication that this is the last NAS message or that the NAS procedure (i.e., TAU in the example of FIG. 8) has been completed. Network node 115 can then determine whether to suspend or release the connection. At step 850, network node 115 sends a RRC_Suspend message to UE 110.

Figure 9:
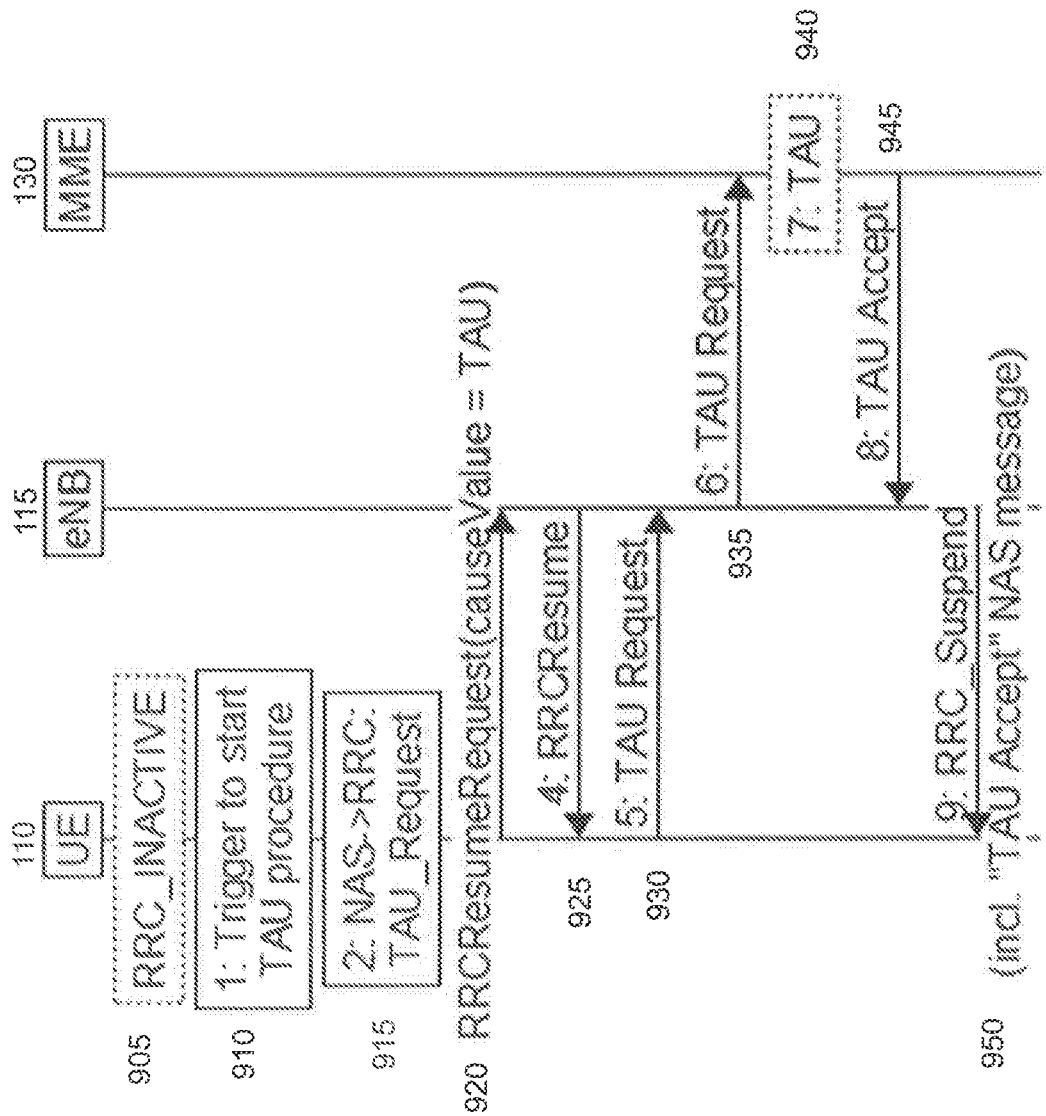
FIG. 9 is a signal flow diagram illustrating an example TAU in RRC_INACTIVE state to suspend with the last TAU message, in accordance with certain embodiments.

FIG. 9 is a signal flow diagram illustrating an example TAU in RRC_INACTIVE state to suspend with the last TAU message, in accordance with certain embodiments. Similar to FIGS. 6-8 described above, FIG. 9 illustrates an exchange of signals between UE 110, network node 115 (an eNB in the example of FIG. 9), and core network node 130 (e.g., an MME in the example of FIG. 9). At step 905, UE 110 is in RRC_INACTIVE state. At step 910, UE 110 is triggered to start a TAU procedure (e.g., as described above in relation to FIG. 5). At step 915, UE 110 determines what type of NAS procedure is being performed. In the example of FIG. 9, UE 110 determines that the NAS procedure is a TAU Request (in certain embodiments, the NAS procedure may be a different procedure from a TAU update, such as one of the NAS procedures described above in relation to FIG. 5). At step 920, LE 110 sends a RRCResumeRequest message to network node 115 to initiate resumption of the connection. The request includes a causeValue indicating that the NAS procedure is a TAU procedure. The causeValue informs network node 115 that an NAS procedure (specifically, a TAU procedure) has started or is ongoing. In this way, network node 115 can choose not to suspend the UE context (to RRC_INACTIVE state) or to release the UE context (to RRC_IDLE state) until it gets another indication that the NAS procedure has been completed. At step 925, network node 115 sends a RRCResume message to UE 110 as part of resuming the connection.

At step 930, UE 110 sends a TAU Request message to network node 115. At step 935, network node 115 sends the TAU Request message to core network node 130. At step 940, core network node 130 performs the TAU procedure associated with UE 110. At step 945, core network node 130 sends a TAU Accept message to network node 115. At step 950, network node 115 sends a RRC_Suspend message to UE 110. In the example embodiment of FIG. 9, the RRC_Suspend message includes a "TAU Accept" NAS message.

Thus, FIGS. 8 and 9 illustrate another variant of the various embodiments described herein in which UE 110 indicated to network node 115 what type of NAS procedure it is executing (e.g., a TAU procedure in the examples of FIGS. 8 and 9). With this information, network node 115 can decide to release or suspend the UE context in conjunction with the UE receiving the TAU Accept message. In certain embodiments, UE 110 can also indicate other NAS procedures such as Attach, Registration, PDU session activation, Authentication, or any other suitable procedure.

According to another example embodiment, the normal TAU procedure may be used. However, after the "TAU Accept" message has been forwarded by network node 115 to UE 110, if there are no more NAS signaling either to or from UE 110 for a certain duration of time (Txx), network node 115 transmits a RRC_Suspend message to UE 110 and UE 110 enters RRC_INACTIVE state. Such an approach is described in more detail below in relation to FIG. 10.

Figure 10:
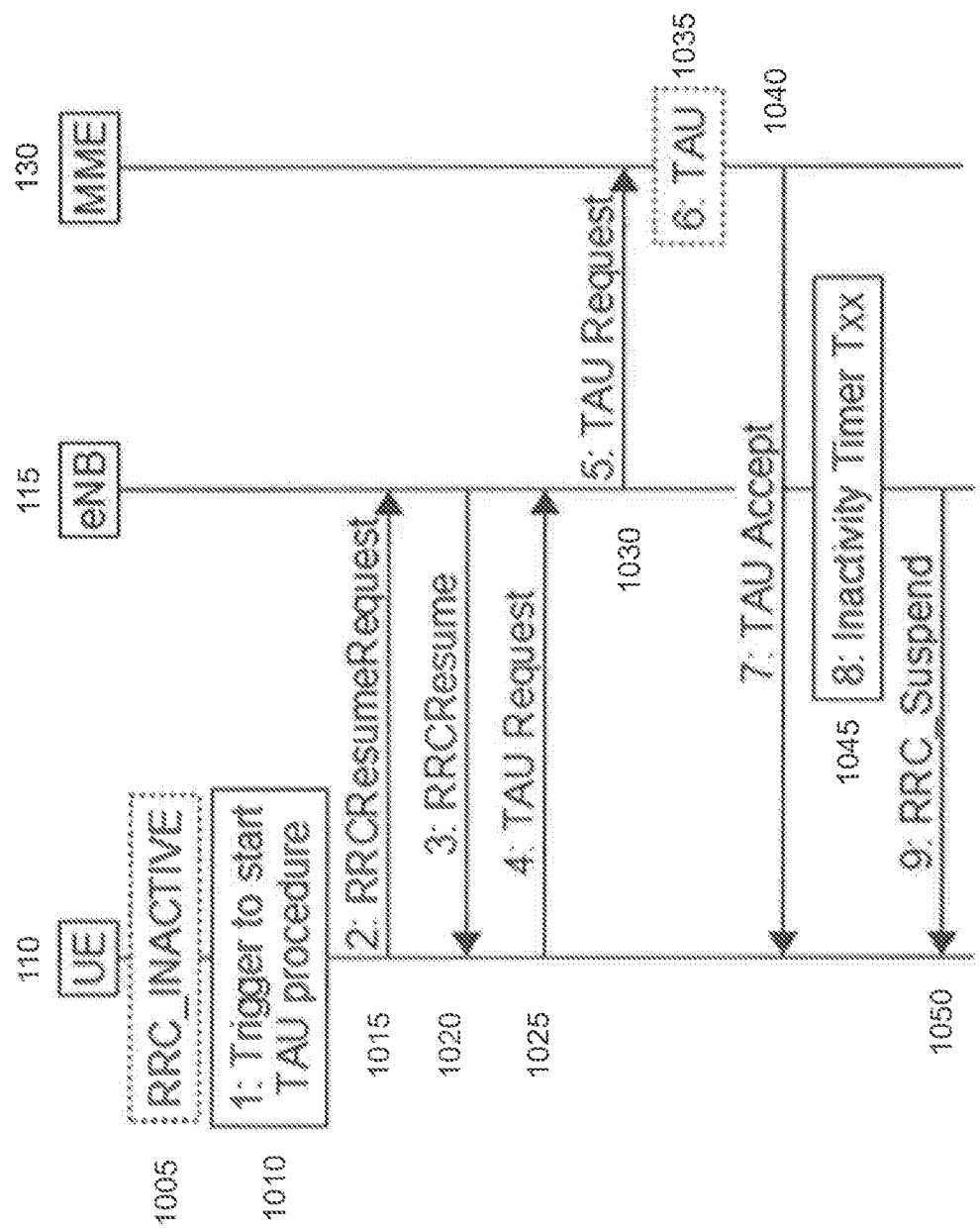
FIG. 10 is a signal flow diagram illustrating an example TAU in RRC_INACTIVE state where the network node suspends the UE after a timer expires, in accordance with certain embodiments.

FIG. 10 is a signal flow diagram illustrating an example TAU in RRC_INACTIVE state where the network node suspends the UE after a timer expires, in accordance with certain embodiments. Similar to FIGS. 6-9 described above, FIG. 10 illustrates an exchange of signals between UE 110, network node 115 (an eNB in the example of FIG. 10), and core network node 130 (an MME in the example of FIG. 10).

At step 1005, UE 110 is in RRC_INACTIVE state. At step 1010, UE 110 is triggered to start a TAU procedure (e.g., as described above in relation to FIG. 5). At step 1015, UE 110 sends a RRCResumeRequest message to network node 115 to initiate resumption of the connection. At step 1020, network node 115 sends a RRCResume message to UE 110 as part of resuming the connection.

At step 1025, UE 110 sends a TAU Request message to network node 115. At step 1030, network node 115 forwards the TAU Request message to core network node 130. At step 1035, core network node 130 performs the TAU procedure associated with UE 110. At step 1040, core network node 130 sends a TAU Accept message to network node 115, which is forwarded to UE 110 by network node 115. At step 1045, network node 115 starts an inactivity timer of a certain duration (e.g., Txx). For example, in certain embodiments the duration of the inactivity timer may be one second (or in some cases less given that there is likely no end-user involvement needed in the NAS procedure). If there is no more NAS signaling either to or from UE 110 for the duration of the inactivity timer (i.e., before the inactivity timer expires), at step 1050 network node 115 sends a RRC_Suspend message to UE 110.

Although the example embodiments described above in relation to FIGS. 6-10 are described using an eNB as an example of network node 115 and an MME as an example of core network node 130, the present disclosure is not limited to such an example. Rather, the present disclosure contemplates that the various embodiments described herein are applicable to scenarios in which other types of network nodes (e.g., a gNB) and/or core network nodes (e.g., an Access and Mobility Management Function (AMF)) are used. Furthermore, the present disclosure contemplates that all of the various embodiments described herein are applicable if the UE is in ECM_CONNECTED (i.e., CN_CONNECTED (or the equivalent 5G-CN state)). Additionally, the various embodiments described herein are also applicable for other NAS procedures (such as Attach, Registration, PDU session activation, Authentication, or any other suitable procedure).

If a UE is in ECM_CONNECTED and RRC_CONNECTED, it is likely the UE will have ongoing UP traffic when it triggers the TAU procedure. However, this is not visible to the NAS layer and the same procedures will still have to be used. However, if there is also additional NAS signaling ongoing when the TAU (or other NAS procedure) is triggered, the NAS could infer that the TAU flag (as described above in relation to FIGS. 8 and 9) could be omitted. This could, for example, occur: if there are other NAS messages on the way; if there have been other NAS messages transmitted during some time (e.g., using a timer which resets every time a NAS message is sent and if a TAU is sent during that time, the RRC is not informed); and any other suitable reason.

Figure 11:
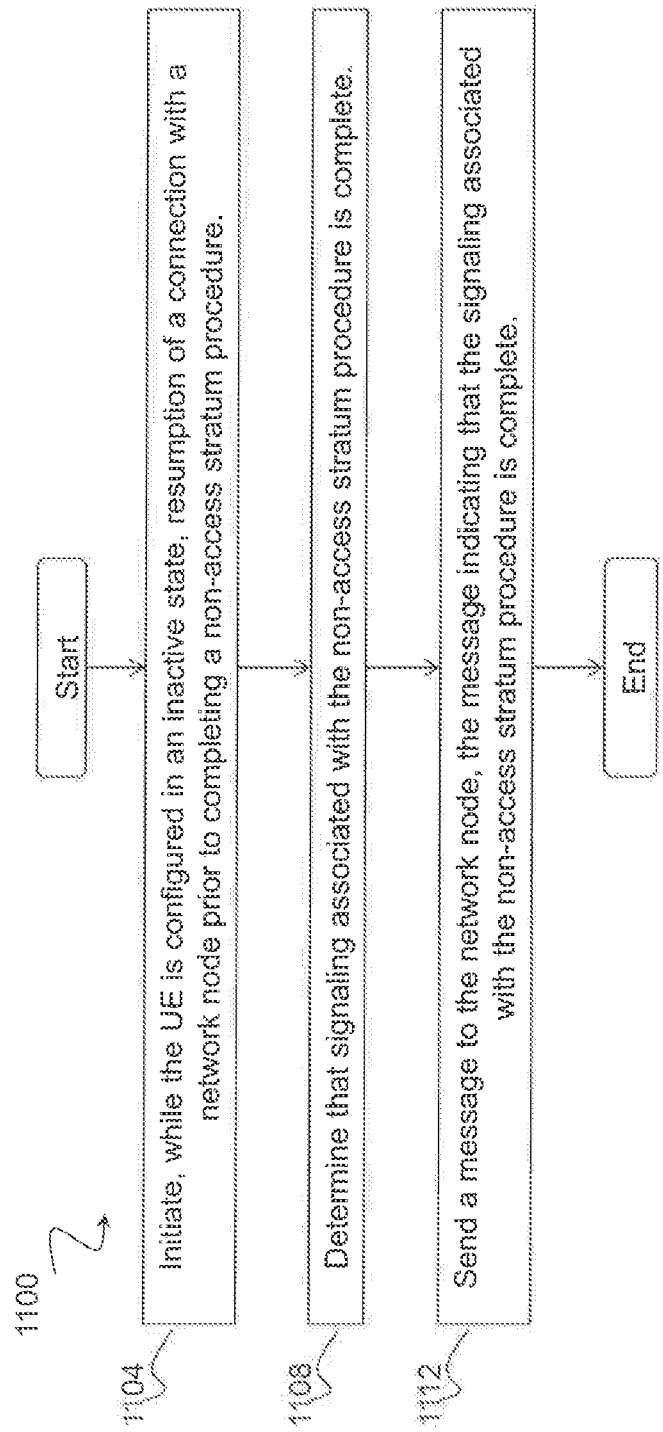
FIG. 11 is a flow diagram of a method in a UE, in accordance with certain embodiments.

FIG. 11 is a flow diagram of a method 1100 in a UE, in accordance with certain embodiments. Method 1100 begins at step 1104, where the UE initiates, while the UE is configured in an inactive state, resumption of a connection with a network node prior to completing an NAS procedure. In certain embodiments, the NAS procedure may comprise at least one of: a TAU; an attach procedure; a registration procedure; a PDU session activation; and an authentication procedure.

In certain embodiments, initiating resumption of the connection with the network node prior to completing the NAS procedure may comprise sending, to the network node, a request to resume the connection, and receiving, from the network node, a connection resume message. The request to resume the connection may comprise an indication of a type of NAS procedure being performed by the UE. In certain embodiments, the NAS procedure may be a TAU, and the method may comprise sending, to the network node, a TAU request message.

In certain embodiments, the method may further comprise sending another message to the network node, after initiating the NAS procedure, indicating that the NAS-procedure has started or is ongoing.

At step 1108, the UE determines that signaling associated with the non-access stratum procedure is complete. In certain embodiments, the method may further comprise receiving a TAU accept message indicating that the TAU procedure has been completed. Determining that the signaling associated with the NAS procedure is complete may comprise obtaining, at the RRC layer of the UE, an indication from an NAS layer of the UE that the UE has received the TAU accept message.

At step 1112, the UE sends a message to the network node, the message indicating that the signaling associated with the NAS procedure is complete. In certain embodiments, sending the message to the network node may comprise transmitting, by a RRC layer of the UE, the message to a RRC layer of the network node. In certain embodiments, the method may further comprise receiving, from the network node, in response to sending the message indicating that the signaling associated with the NAS procedure is complete, an instruction to suspend the connection.

Figure 12:
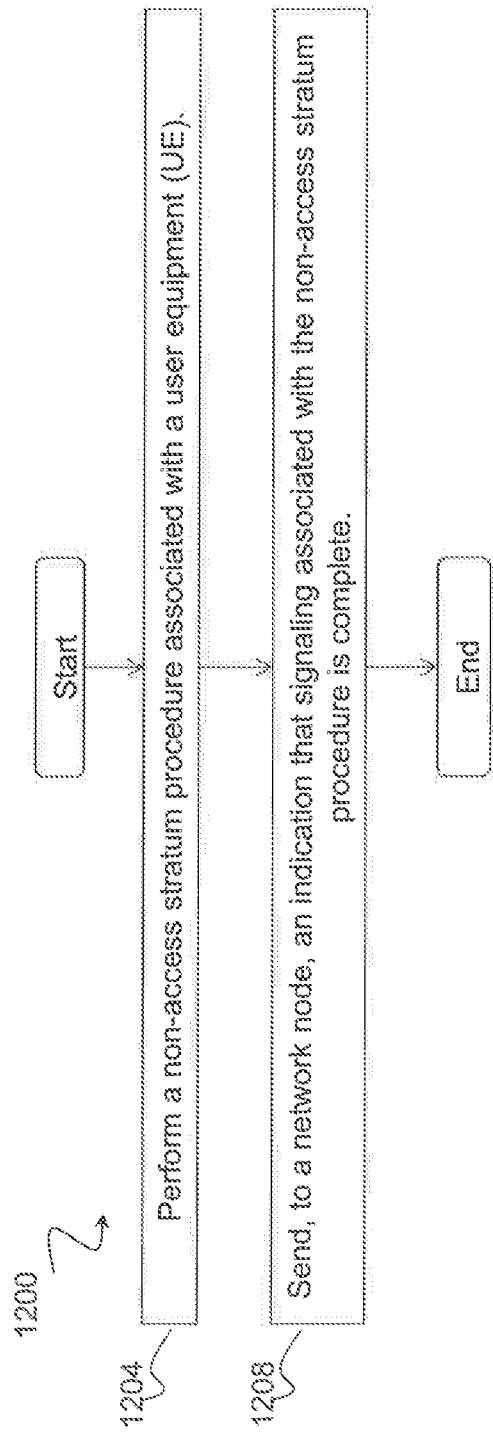
FIG. 12 is a flow diagram of a method in a core network node, in accordance with certain embodiments.

FIG. 12 is a flow diagram of a method 1200 in a core network node, in accordance with certain embodiments. Method 1200 begins at step 1204, where the core network node performs an NAS procedure associated with UE. In certain embodiments, the core network node may be an MME. In certain embodiments, the NAS procedure may comprise at least one of: a TAU; an attach procedure; a registration procedure; a PDU session activation; and an authentication procedure.

At step 1208, the core network node sends, to a network node, an indication that signaling associated with the NAS procedure is complete. In certain embodiments, the network node may be one of a gNB or an eNB.

In certain embodiments, the NAS procedure may comprise the TAU, and the indication that the signaling associated with the NAS procedure is complete may be a TAU accept message. In certain embodiments, the NAS procedure may comprise the TAU, and the indication that the signaling associated with the NAS procedure is complete may be a signal from an NAS layer of the core network node. In certain embodiments, the signal from the NAS layer of the core network node may be sent as part of an S1 or NG-C message used to carry the TAU accept message. In certain embodiments, the signal from the NAS layer of the core network node may be sent separate from an S1 or NG-C message used to carry the TAU accept message.

In certain embodiments, the method may further comprise sending another message to the network node, after the NAS procedure has been initiated, indicating that the NAS procedure has started or is ongoing.

Figure 13:
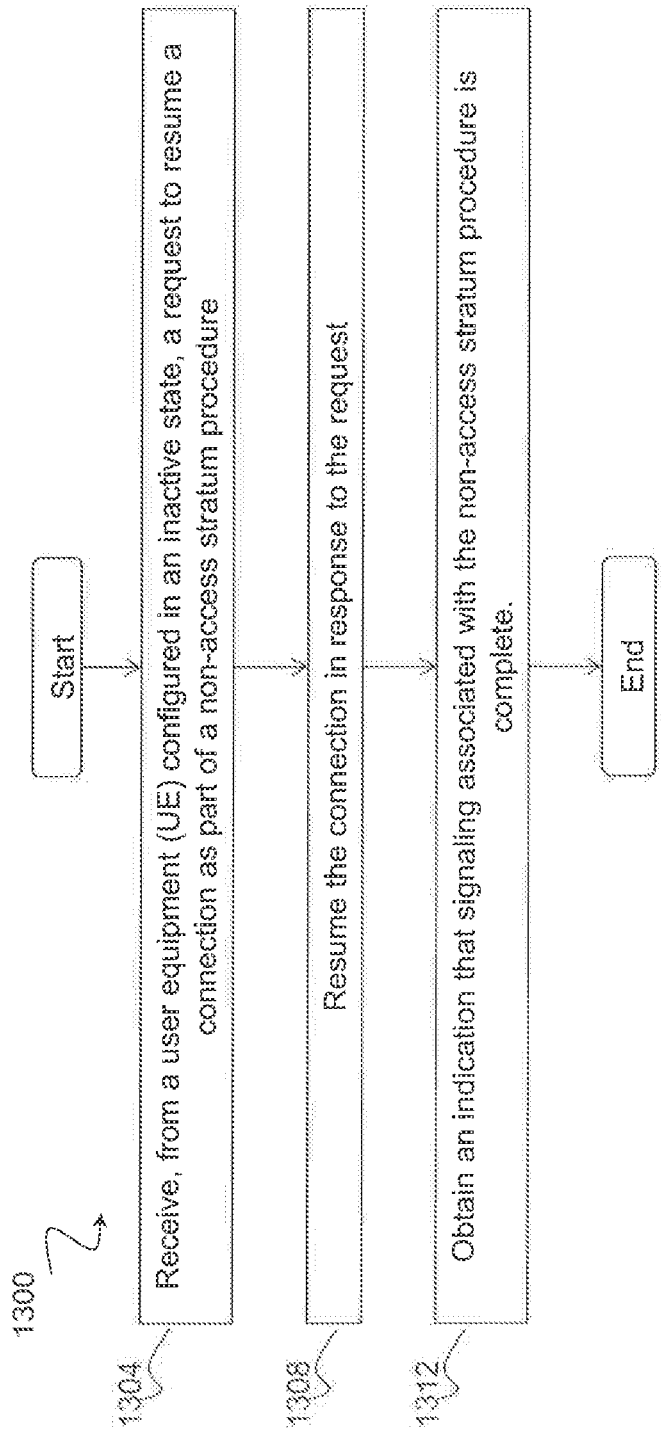
FIG. 13 is a flow diagram of a method in a network node, in accordance with certain embodiments.

FIG. 13 is a flow diagram of a method 1300 in a network node, in accordance with certain embodiments. Method 1300 begins at step 1304, where the network node receives, from a UE configured in an inactive state, a request to resume a connection as part of an NAS procedure. In certain embodiments, the NAS procedure may comprise at least one of: a TAU; an attach procedure; a registration procedure; a PDU session activation; and an authentication procedure. In certain embodiments, the request to resume the connection may indicate a type of NAS procedure being performed by the UE.

At step 1308, the network node resumes the connection in response to the request. In certain embodiments, the method may further comprise determining that the NAS procedure is a TAU, and, in response to determining that the NAS procedure is a TAU, instructing the UE to perform a RAN area update.

At step 1312, the network node obtains an indication that signaling associated with the NS procedure is complete. In certain embodiments, obtaining the indication that signaling associated with the NAS procedure is complete may comprise determining that signaling associated with the NAS procedure is complete based on statistical information related to NAS procedures. In certain embodiments, obtaining the indication that signaling associated with the NAS procedure is complete may comprise initiating a timer, and, in response to the timer expiring, determining that the signaling associated with the NAS procedure is complete.

In certain embodiments, obtaining the indication that signaling associated with the NAS procedure is complete may comprise receiving, from one of a core network node or the UE, the indication that the signaling associated with the NAS procedure is complete. The indication that the signaling associated with the NAS procedure is complete may be received from at least one of: an NAS layer of the core network node; and an NAS layer of the UE. In certain embodiments, the indication that the signaling associated with the NAS procedure is complete may be included in a message that is part of the NAS procedure. In certain embodiments, the indication that the signaling associated with the NAS procedure is complete may be included in a separate message that is not a part of the NAS procedure.

In certain embodiments, the method may further comprise, in response to obtaining the indication, suspending the connection. In certain embodiments, the method may further comprise, in response to obtaining the indication, releasing the connection.

Figure 14:
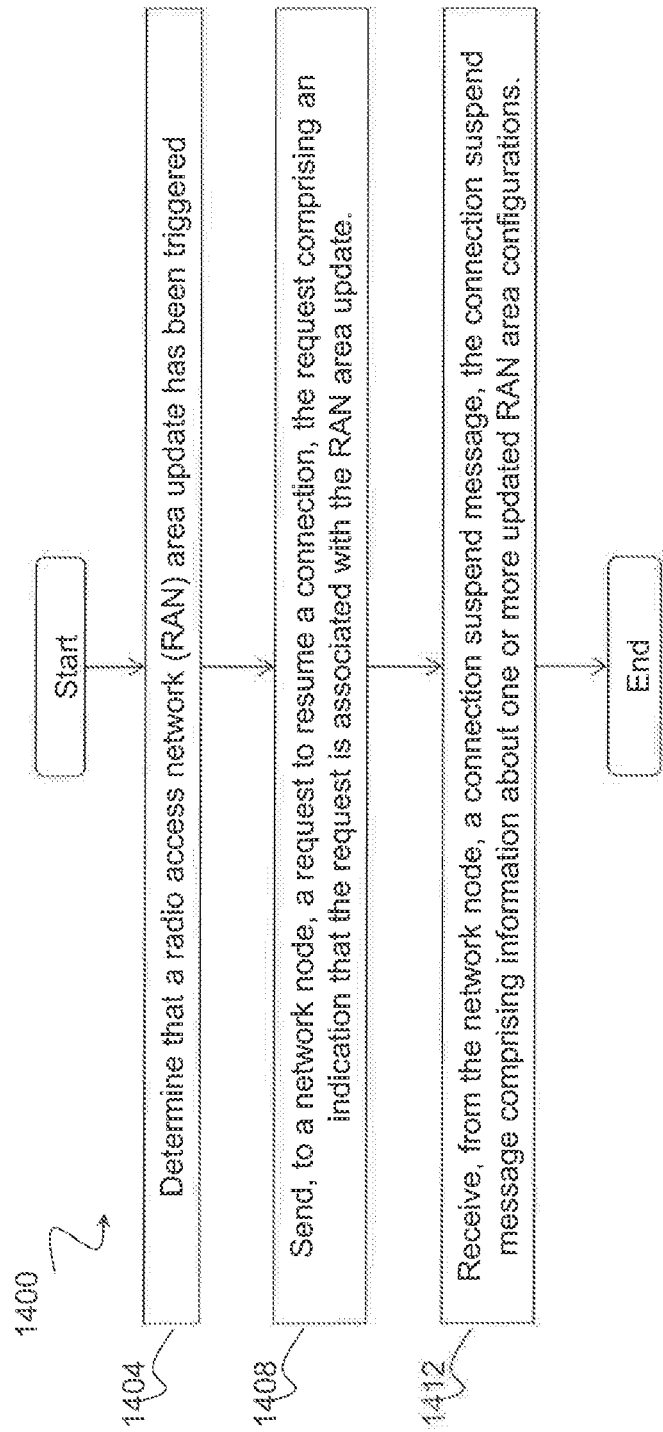
FIG. 14 is a flow diagram of a method in a UE, in accordance with certain embodiments.

FIG. 14 is a flow diagram of a method 1400 in a UE, in accordance with certain embodiments. Method 1400 begins at step 1404, where the UE determines that a RAN area update has been triggered. In certain embodiments, determining that the RAN area update has been triggered may be based on one or more of: the UE has entered a cell outside of a RAN area of the UE; and expiration of a RAN area update timer.

At step 1408, the UE sends, to a network node, a request to resume a connection, the request comprising an indication that the request is associated with the RAN area update. In certain embodiments, the indication that the request is associated with the RAN area update may comprise a cause value included in the request to resume the connection. In certain embodiments, the request may further comprise an indication that the request is also associated with a tracking area update.

At step 1412, the LE receives, from the network node, a connection suspend message, the connection suspend message comprising information about one or more updated RAN area configurations.

Figure 15:
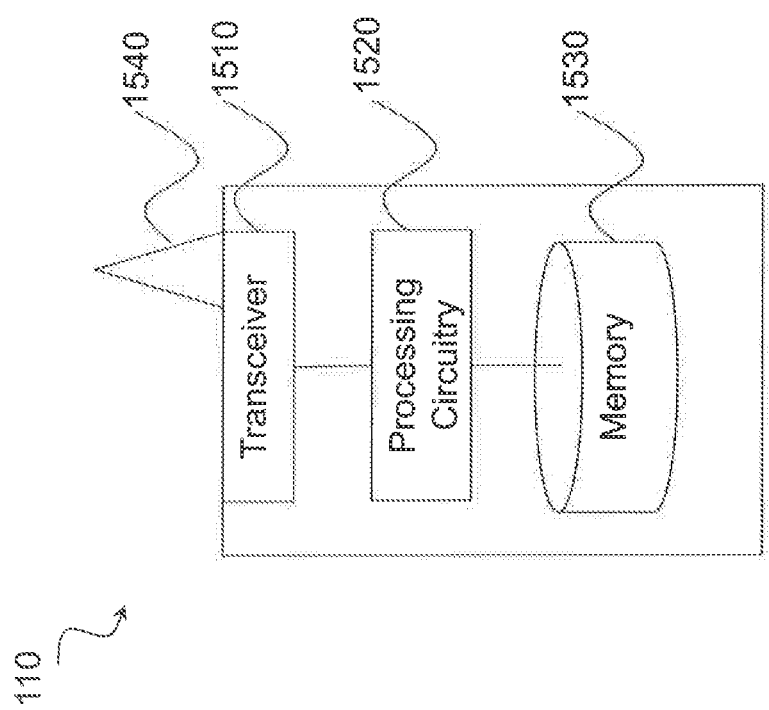
FIG. 15 is a block schematic of an exemplary UE, in accordance with certain embodiments.

FIG. 15 is a block schematic of an exemplary UE, in accordance with certain embodiments. UE 110 may refer to any type of wireless device communicating with a node and/or with another wireless device in a cellular or mobile communication system. Examples of UE 110 include a mobile phone, a smart phone, a PDA, a portable computer (e.g., laptop, tablet), a sensor, a modem, an MTC device, an M2M device, LEE, LME, USB dongles, a D2D capable device, or another device that can provide wireless communication. A UE 110 may also be referred to as a wireless device, a station (STA), a device, or a terminal in some embodiments. UE 110 includes transceiver 1510, processing circuitry 1520, and memory 1530. In some embodiments, transceiver 1510 facilitates transmitting wireless signals to and receiving wireless signals from network node 115 (e.g., via antenna 1540), processing circuitry 1520 executes instructions to provide some or all of the functionality described above as being provided by UE 110, and memory 1530 stores the instructions executed by processing circuitry 1520.

Processing circuitry 1520 may include any suitable combination of hardware and software implemented in one or more modules to execute instructions and manipulate data to perform some or all of the described functions of UE 110, such as the functions of UE 110 described above in relation to FIGS. 1-14. In some embodiments, processing circuitry 1520 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 1530 is generally operable to store instructions, such as a computer program, software, an application including one or more of logic, rules, algorithms, code, tables, etc. and/or other instructions capable of being executed by processing circuitry 1520. Examples of memory 1530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processing circuitry 1520.

Other embodiments of UE 110 may include additional components beyond those shown in FIG. 15 that may be responsible for providing certain aspects of the UE's functionality, including any of the functionality described above and/or any additional functionality (including any functionality necessary to support the solution described above). As just one example, UE 110 may include input devices and circuits, output devices, and one or more synchronization units or circuits, which may be part of the processing circuitry 1520. Input devices include mechanisms for entry of data into UE 110. For example, input devices may include input mechanisms, such as a microphone, input elements, a display, etc. Output devices may include mechanisms for outputting data in audio, video and/or hard copy format. For example, output devices may include a speaker, a display, etc.

Figure 16:
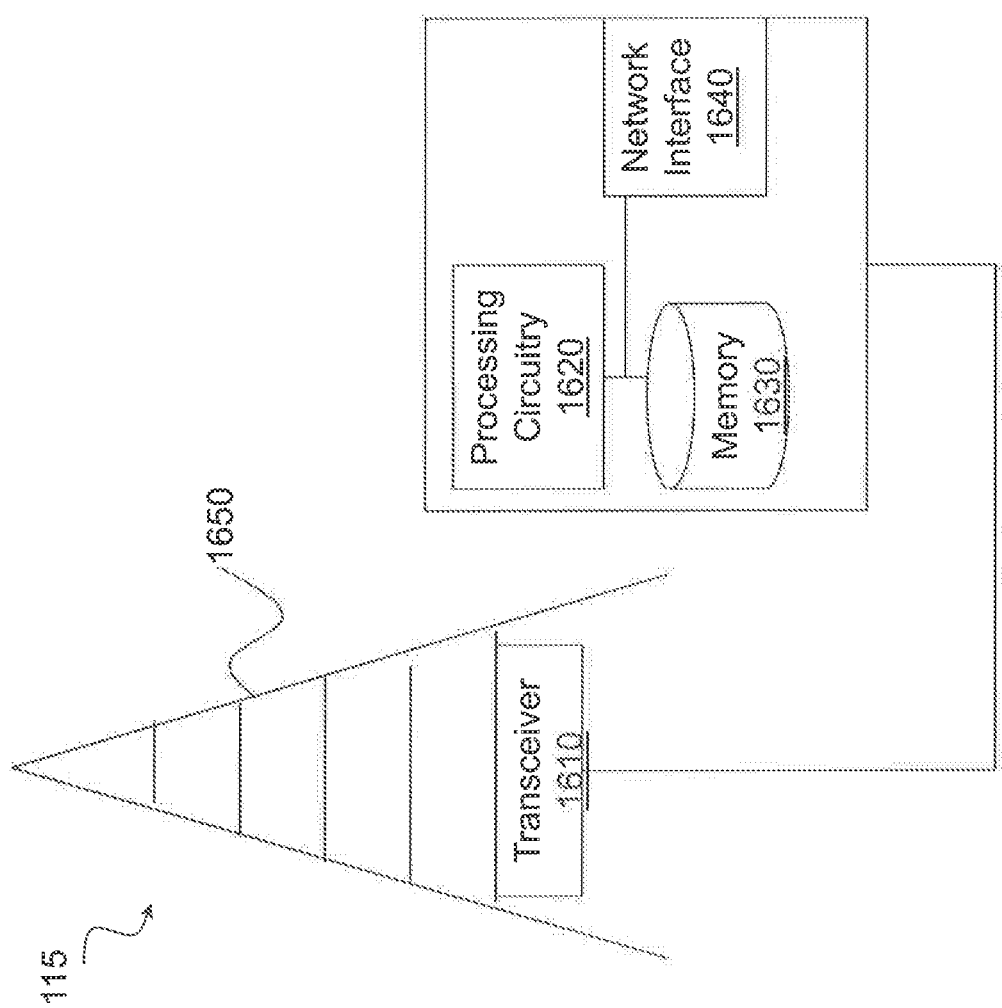
FIG. 16 is a block schematic of an exemplary network node, in accordance with certain embodiments.

FIG. 16 is a block schematic of an exemplary network node, in accordance with certain embodiments. Network node 115 may be any type of radio network node or any network node that communicates with a UE and/or with another network node. Examples of network node 115 include an eNB, a gNB, a node B, a BS, a wireless AP (e.g., a Wi-Fi AP), a low power node, a BTS, relay, donor node controlling relay, transmission points, transmission nodes, RRU, RRH, MSR radio node such as MSR BS, nodes in DAS, O&M, OSS, SON, positioning node (e.g., E-SMLC), MDT, or any other suitable network node. Network nodes 115 may be deployed throughout network 500 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 1610, processing circuitry 1620, memory 1630, and network interface 1640. In some embodiments, transceiver 1610 facilitates transmitting wireless signals to and receiving wireless signals from UE 110 (e.g., via antenna 1650), processing circuitry 1620 executes instructions to provide some or all of the functionality described above as being provided by a network node 115, memory 1630 stores the instructions executed by processing circuitry 1620, and network interface 1640 communicates signals to backend network components, such as a gateway, switch, router, Internet, PSTN, core network nodes or radio network controllers, etc.

Processing circuitry 1620 may include any suitable combination of hardware and software implemented in one or more modules to execute instructions and manipulate data to perform some or all of the described functions of network node 115, such as those described above in relation to FIGS. 1-14 above. In some embodiments, processing circuitry 1620 may include, for example, one or more computers, one or more CPUs, one or more microprocessors, one or more applications, one or more ASICs, one or more FPGAs, and/or other logic.

Memory 1630 is generally operable to store instructions, such as a computer program, software, an application including one or more of logic, rules, algorithms, code, tables, etc. and/or other instructions capable of being executed by a processing circuitry 1620. Examples of memory 1630 include computer memory (for example, RAM or ROM), mass storage media (for example, a hard disk), removable storage media (for example, a CD or a DVD), and/or or any other volatile or non-volatile, non-transitory computer-readable and/or computer-executable memory devices that store information.

In some embodiments, network interface 1640 is communicatively coupled to processing circuitry 1620 and may refer to any suitable device operable to receive input for network node 115, send output from network node 115, perform suitable processing of the input or output or both, communicate to other devices, or any combination of the preceding. Network interface 1640 may include appropriate hardware (e.g., port, modem, network interface card, etc.) and software, including protocol conversion and data processing capabilities, to communicate through a network.

Other embodiments of network node 115 may include additional components beyond those shown in FIG. 16 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 17:
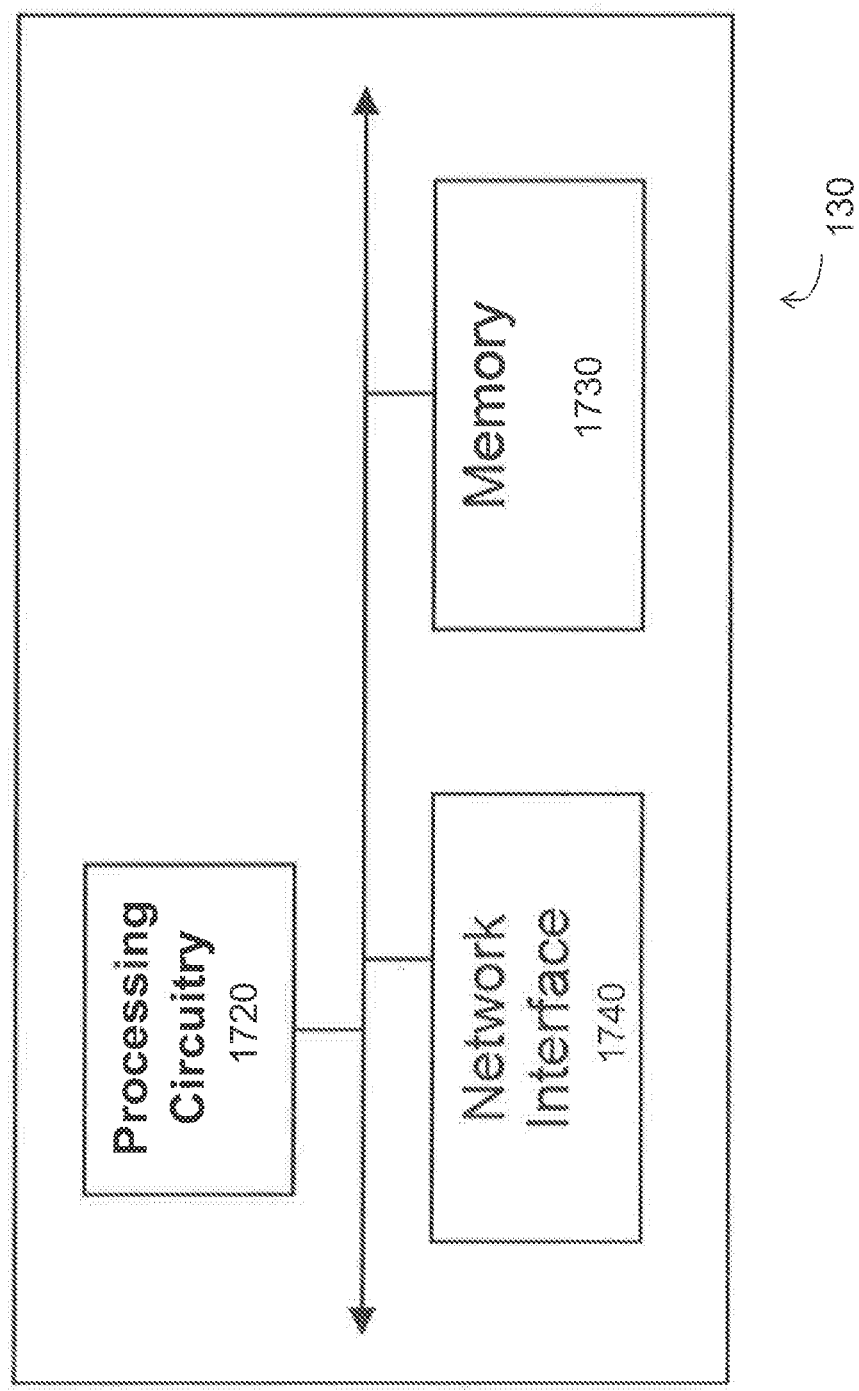
FIG. 17 is a block schematic of an exemplary radio network controller (RNC) or core network node, in accordance with certain embodiments.

FIG. 17 is a block schematic of an exemplary RNC or core network node 130, in accordance with certain embodiments. Examples of network nodes can include an MSC, a serving GPRS support node (SGSN), an MME, an AMF, an RNC, a BSC, and so on. RNC or core network node 130 includes processing circuitry 1720, memory 1730, and network interface 1740. In some embodiments, processing circuitry 1720 executes instructions to provide some or all of the functionality described above as being provided by the network node, memory 1730 stores the instructions executed by processing circuitry 1720, and network interface 1740 communicates signals to any suitable node, such as a gateway, switch, router, Internet, PSTN, network nodes 115, RNCs or core network nodes, etc.

Processing circuitry 1720 may include any suitable combination of hardware and software implemented in one or more modules to execute instructions and manipulate data to perform some or all of the described functions of the radio network controller or core network node 130. In some embodiments, processing circuitry 1720 may include, for example, one or more computers, one or more CPUs, one or more microprocessors, one or more applications, one or more ASICs, one or more FPGAs, and/or other logic.

Memory 1730 is generally operable to store instructions, such as a computer program, software, an application including one or more of logic, rules, algorithms, code, tables, etc. and/or other instructions capable of being executed by processing circuitry 1720. Examples of memory 1730 include computer memory (for example, RAM or ROM), mass storage media (for example, a hard disk), removable storage media (for example, a CD or a DVD), and/or or any other volatile or non-volatile, non-transitory computer-readable and/or computer-executable memory devices that store information.

In some embodiments, network interface 1740 is communicatively coupled to processing circuitry 1720 and may refer to any suitable device operable to receive input for RNC or core network node 130, send output from the RNC or core network node 130, perform suitable processing of the input or output or both, communicate to other devices, or any combination of the preceding. Network interface 1740 may include appropriate hardware (e.g., port, modem, network interface card, etc.) and software, including protocol conversion and data processing capabilities, to communicate through a network.

Other embodiments of RNC or core network node 130 may include additional components beyond those shown in FIG. 17 that may be responsible for providing certain aspects of the functionality of RNC or core network node 130, including any of the functionality described above and/or any additional functionality (including any functionality necessary to support the embodiments described above).

Figure 18:
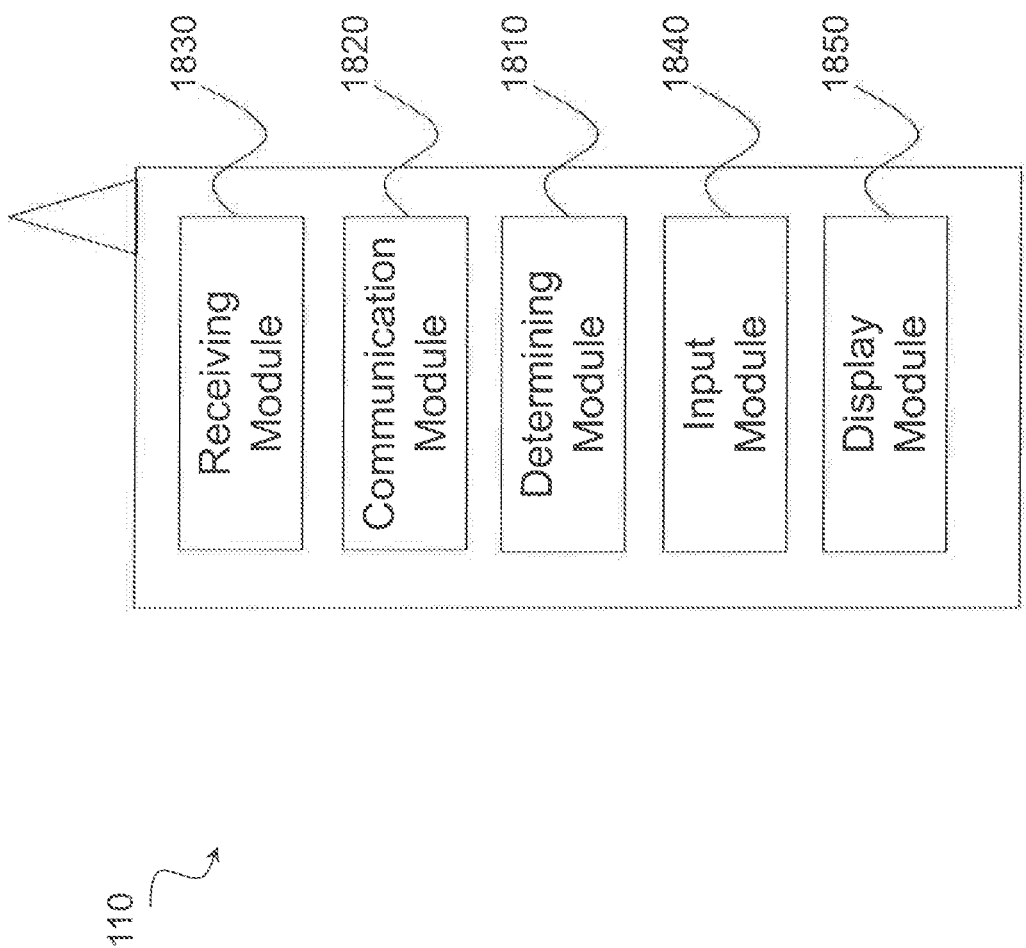
FIG. 18 is a block schematic of an exemplary UE, in accordance with certain embodiments.

FIG. 18 is a block schematic of an exemplary UE 110, in accordance with certain embodiments. UE 110 may include one or more modules. For example, UE 110 may include a determining module 1810, a communication module 1820, a receiving module 1830, an input module 1840, a display module 1850, and any other suitable modules. In some embodiments, one or more of determining module 1810, communication module 1820, receiving module 1830, input module 1840, display module 1850, or any other suitable module may be implemented using one or more processors, such as processing circuitry 1520 described above in relation to FIG. 15. In certain embodiments, the functions of two or more of the various modules may be combined into a single module. UE 110 may perform the methods for NAS procedures in RRC_INACTIVE state described above with respect to FIGS. 1-14.

Determining module 1810 may perform the processing functions of UE 110. For example, determining module 1810 may initiate, while UE 110 is configured in an inactive state, resumption of a connection with a network node prior to completing a NAS procedure. As another example, determining module 1810 may determine that signaling associated with the NAS procedure is complete. As another example, determining module 1810 may determine that a RAN area update has been triggered.

Determining module 1810 may include or be included in one or more processors, such as processing circuitry 1520 described above in relation to FIG. 15. Determining module 1810 may include analog and/or digital circuitry configured to perform any of the functions of determining module 1810 and/or processing circuitry 1520 described above. The functions of determining module 1810 described above may, in certain embodiments, be performed in one or more distinct modules.

Communication module 1820 may perform the transmission functions of UE 110. Communication module 1820 may send any of the messages described above in relation to FIGS. 5-14 as sent by UE 110. For example, communication module 1820 may send a message to a network node, the message indicating that the signaling associated with the NAS procedure is complete. Communication module 1820 may send the message to the network node by transmitting, by a RRC layer of UE 110, the message to a RRC layer of the network node. As another example, communication module 1820 may send, to the network node, a request to resume the connection. As still another example, communication module 1820 may send, to the network node, a TAU request message. As yet another example, communication module 1820 may send another message to the network node, after initiating the NAS procedure, indicating that the NAS procedure has started or is ongoing. As another example, communication module 1820 may send, to a network node, a request to resume a connection, the request comprising an indication that the request is associated with the RAN area update.

Communication module 1820 may transmit messages to one or more of network nodes 115 of network 500. Communication module 1820 may include a transmitter and/or a transceiver, such as transceiver 1510 described above in relation to FIG. 15. Communication module 1820 may include circuitry configured to wirelessly transmit messages and/or signals. In particular embodiments, communication module 1820 may receive messages and/or signals for transmission from determining module 1810. In certain embodiments, the functions of communication module 1820 described above may be performed in one or more distinct modules.

Receiving module 1830 may perform the receiving functions of UE 110. Receiving module 1830 may receive any of the messages described above in relation to FIGS. 5-14 as being sent to or received by UE 110. For example, receiving module 1830 may receive, from a network node, in response to sending the message indicating that the signaling associated with the NAS procedure is complete, an instruction to suspend the connection. As another example, receiving module 1830 may receive, from the network node, a connection resume message. As still another example, receiving module 1830 may receive a TAU accept message indicating that a TAU procedure has been completed. As yet another example, receiving module 1830 may obtain, at the RRC layer of the UE, an indication from a NAS layer of UE 110 that UE 110 has received the TAU accept message. As another example, receiving module 1830 may receive, from the network node, a connection suspend message, the connection suspend message comprising information about one or more updated RAN area configurations.

Receiving module 1830 may include a receiver and/or a transceiver, such as transceiver 1510 described above in relation to FIG. 15. Receiving module 1830 may include circuitry configured to wirelessly receive messages and/or signals. In particular embodiments, receiving module 1830 may communicate received messages and/or signals to determining module 1810. The functions of receiving module 1830 described above may, in certain embodiments, be performed in one or more distinct modules.

Input module 1840 may receive user input intended for UE 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 1810. The functions of input module 1840 described above may, in certain embodiments, be performed in one or more distinct modules.

Display module 1850 may present signals on a display of UE 110. Display module 1850 may include the display and/or any appropriate circuitry and hardware configured to present signals on the display. Display module 1850 may receive signals to present on the display from determining module 1810. The functions of display module 1850 described above may, in certain embodiments, be performed in one or more distinct modules.

Determining module 1810, communication module 1820, receiving module 1830, input module 1840, and display module 1850 may include any suitable configuration of hardware and/or software. UE 110 may include additional modules beyond those shown in FIG. 18 that may be responsible for providing any suitable functionality, including any of the functionality described above and/or any additional functionality (including any functionality necessary to support the various solutions described herein).

Figure 19:
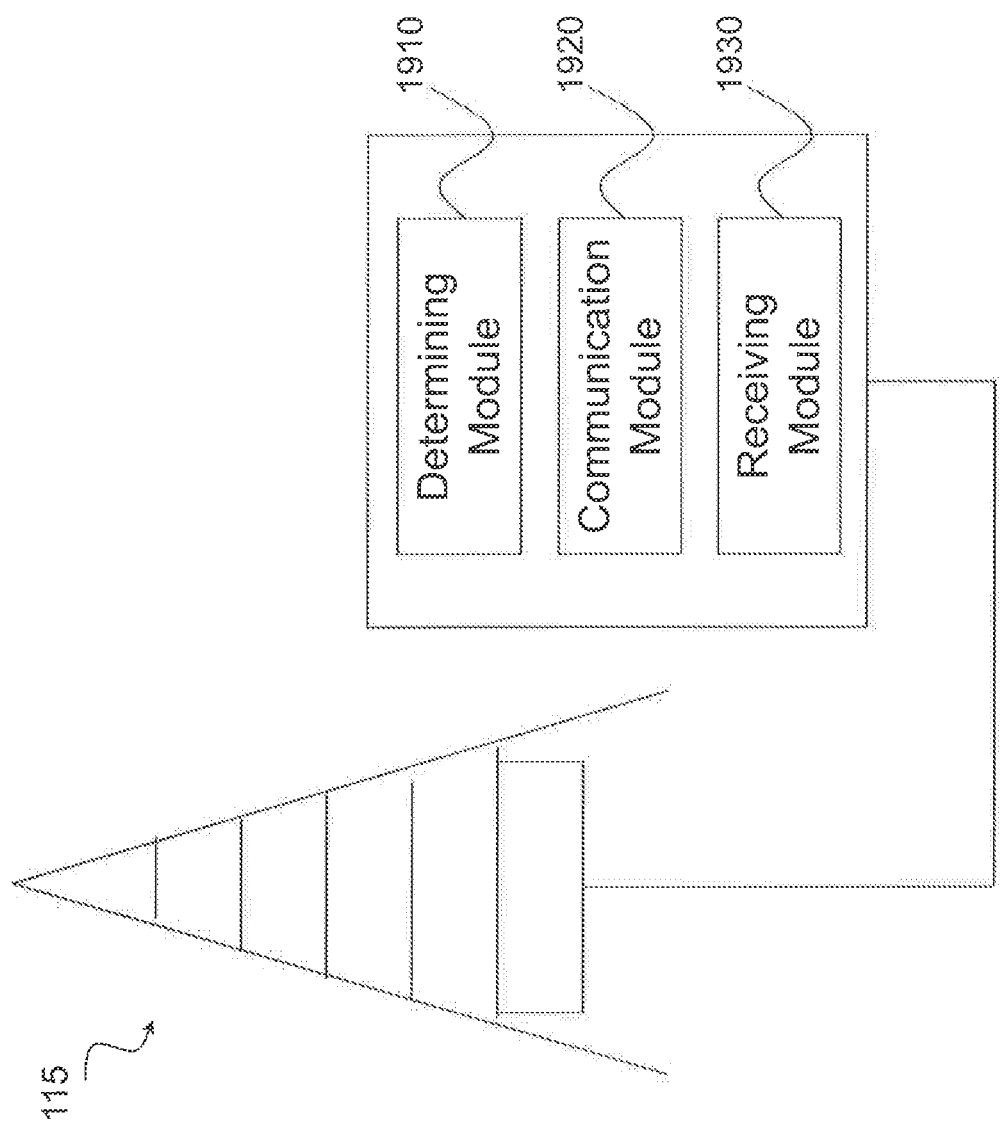
FIG. 19 is a block schematic of an exemplary network node, in accordance with certain embodiments.

FIG. 19 is a block schematic of an exemplary network node 115, in accordance with certain embodiments. Network node 115 may include one or more modules. For example, network node 115 may include determining module 1910, communication module 1920, receiving module 1930, and any other suitable modules. In some embodiments, one or more of determining module 1910, communication module 1920, receiving module 1930, or any other suitable module may be implemented using one or more processors, such as processing circuitry 1620 described above in relation to FIG. 16. In certain embodiments, the functions of two or more of the various modules may be combined into a single module. Network node 115 may perform the methods for NAS procedures in RRC_INACTIVE state described above with respect to FIGS. 1-14.

Determining module 1910 may perform the processing functions of network node 115. For example, determining module 1910 may resume a connection in response to a request. As another example, determining module 1910 may obtain an indication that signaling associated with the NAS procedure is complete. As still another example, determining module 1910 may, in response to obtaining the indication, suspend the connection. As yet another example, determining module 1910 may, in response to obtaining the indication, release the connection. As another example, determining module 1910 may determine that signaling associated with the NAS procedure is complete based on statistical information related to NAS procedures. As another example, determining module 1910 may initiate a timer, and, in response to the timer expiring, determine that the signaling associated with the NAS procedure is complete. As another example, determining module 1910 may determine that the non-access stratum procedure is a TAU.

Determining module 1910 may include or be included in one or more processors, such as processing circuitry 1620 described above in relation to FIG. 16. Determining module 1910 may include analog and/or digital circuitry configured to perform any of the functions of determining module 1910 and/or processing circuitry 1620 described above. The functions of determining module 1910 may, in certain embodiments, be performed in one or more distinct modules.

Communication module 1920 may perform the transmission functions of network node 115. For example, communication module 1920 may send any of the messages described above in relation to FIGS. 5-14 as sent by network node 115. As another example, communication module 1920 may, in response to determining module 1910 determining that the NAS procedure is a TAU, instructing the UE to perform a radio access network (RAN) area update Communication module 1920 may transmit messages to one or more of UEs 110. Communication module 1920 may include a transmitter and/or a transceiver, such as transceiver 1610 described above in relation to FIG. 16. Communication module 1920 may include circuitry configured to wirelessly transmit messages and/or signals. In particular embodiments, communication module 1920 may receive messages and/or signals for transmission from determining module 1910 or any other module. The functions of communication module 1920 may, in certain embodiments, be performed in one or more distinct modules.

Receiving module 1930 may perform the receiving functions of network node 115. Receiving module 1930 may receive any of the messages described above in relation to FIGS. 5-14 as sent to or received by network node 115. For example, receiving module 1930 may receive, from a UE configured in an inactive state, a request to resume a connection as part of a NAS procedure. As another example, receiving module 1930 may obtain an indication that signaling associated with the non-access stratum procedure is complete. As still another example, receiving module 1930 may receive, from one of a core network node or the UE, the indication that the signaling associated with the NAS procedure is complete.

Receiving module 1930 may include a receiver and/or a transceiver, such as transceiver 1610 described above in relation to FIG. 16. Receiving module 1930 may include circuitry configured to wirelessly receive messages and/or signals. In particular embodiments, receiving module 1930 may communicate received messages and/or signals to determining module 1910 or any other suitable module. The functions of receiving module 1930 may, in certain embodiments, be performed in one or more distinct modules.

Determining module 1910, communication module 1920, and receiving module 1930 may include any suitable configuration of hardware and/or software. Network node 115 may include additional modules beyond those shown in FIG. 19 that may be responsible for providing any suitable functionality, including any of the functionality described above and/or any additional functionality (including any functionality necessary to support the various solutions described herein).

Figure 20:
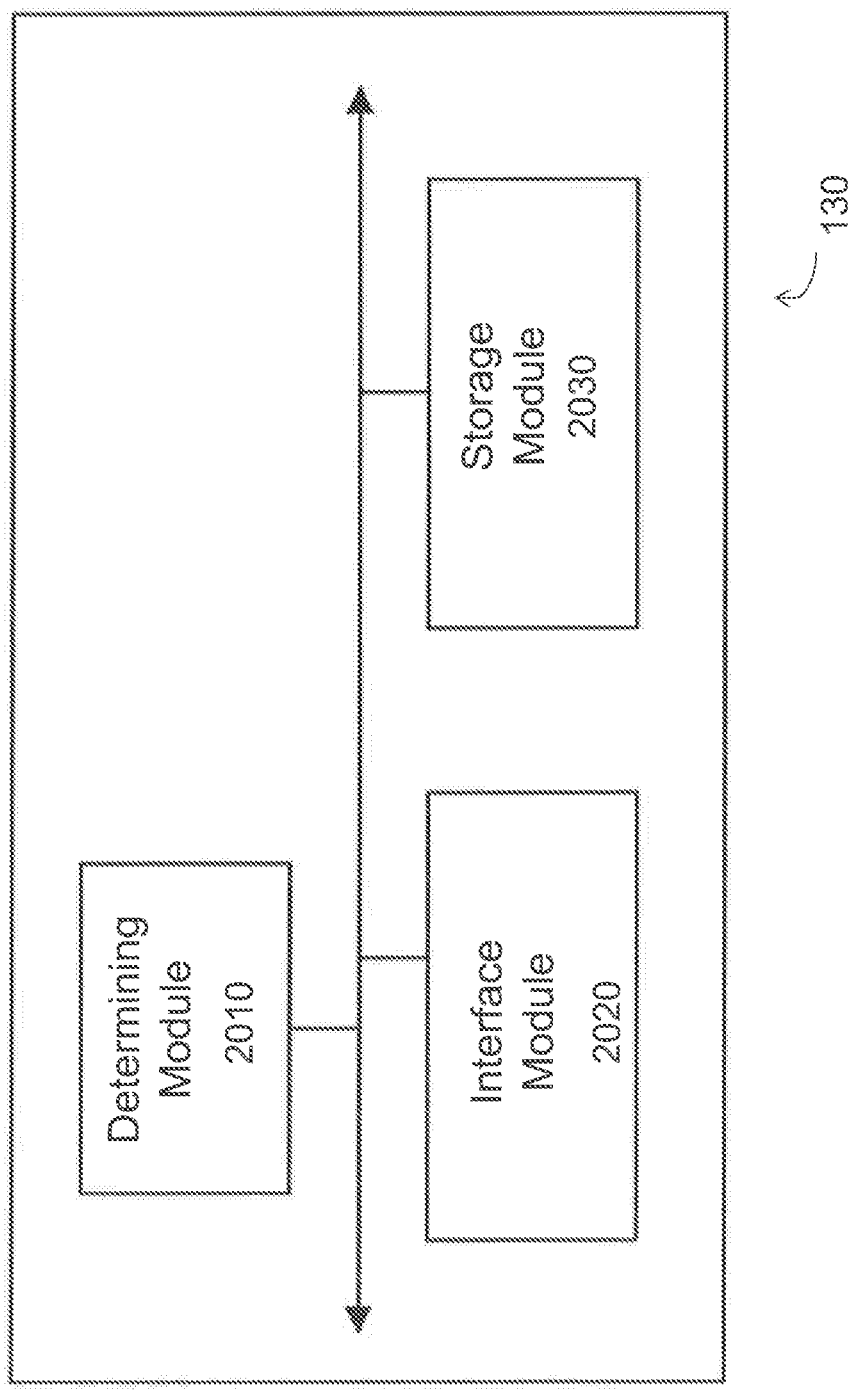
FIG. 20 is a block schematic of an exemplary core network node, in accordance with certain embodiments.

FIG. 20 is a block schematic of an exemplary core network node 130, in accordance with certain embodiments. Core network node 130 may include one or more modules. For example, core network node 130 may include determining module 2010, interface module 2020, storage module 2030, and any other suitable modules. In some embodiments, one or more of determining module 2010, interface module 2020, storage module 2030, or any other suitable module may be implemented using one or more processors, such as processing circuitry 1720 described above in relation to FIG. 17. In certain embodiments, the functions of two or more of the various modules may be combined into a single module. Network node 115 may perform the methods for NAS procedures in RRC_INACTIVE state described above with respect to FIGS. 1-14.

Determining module 2010 may perform the processing functions of core network node 130. For example, determining module 2010 may perform an NAS procedure associated with a UE.

Determining module 2010 may include or be included in one or more processors, such as processing circuitry 1720 described above in relation to FIG. 17. Determining module 2010 may include analog and/or digital circuitry configured to perform any of the functions of determining module 2010 and/or processing circuitry 1720 described above. The functions of determining module 2010 may, in certain embodiments, be performed in one or more distinct modules.

Interface module 2020 may perform the transmission and reception functions of network node 115. Interface module may send any messages described above in relation to FIGS. 5-14 as sent by core network node 130, and/or receive any messages described above in relation to FIGS. 5-14 as sent to or received by core network node 130. For example, interface module 2020 may send, to a network node, an indication that signaling associated with the non-access stratum procedure is complete. In certain embodiments, interface module 2020 may send the indication that signaling associated with the NAS procedure is complete by sending a TAU accept message. In certain embodiments, interface module 2020 may send the indication that signaling associated with the NAS procedure is complete by sending a signal from an NAS layer of core network node 130. In some cases, interface module 2020 may send the signal from the NAS layer of core network node 130 as part of an S1 or NG-C message used to carry the tracking area update accept message. In some cases, interface module 2020 may send the signal from the NAS layer of core network node 130 separate from an S1 or NG-C message used to carry the TAU accept message. As another example, interface module 2020 may send another message to the network node, after the NAS procedure has been initiated, indicating that the NAS procedure has started or is ongoing.

Interface module 2020 may perform the communication and reception functions of core network node 130. Interface module 2020 may include a network interface, such as network interface 1740 described above in relation to FIG. 17. Interface module 2020 may include circuitry configured to receive input for core network node 130, send output for core network node 130, perform suitable processing of the input or output or both (in some cases in conjunction with determining module 2010 described above), communicate to other devices, or any combination of the preceding. Interface module 2020 may be communicatively coupled to determining module 2010, and may include appropriate hardware (e.g., port, modem, network interface card, etc.) and software, including protocol conversion and data processing capabilities, to communicate through a network. The functions of interface module 2020 may, in certain embodiments, be performed in one or more distinct modules.

Storage module 2030 may perform the storage functions of core network node 130. Storage module 2030 may include memory, such as memory 1730 described above in relation to FIG. 17. Storage module 2030 may include circuitry configured to store instructions, such as a computer program, software, an application including one or more of logic, rules, algorithms, code, tables, etc. and/or other instructions capable of being executed by determining module 2010 and/or interface module 2020. The functions of storage module 2020 may, in certain embodiments, be performed in one or more distinct modules.

Determining module 2010, interface module 2020, and storage module 2030 may include any suitable configuration of hardware and/or software. Core network node 130 may include additional modules beyond those shown in FIG. 20 that may be responsible for providing any suitable functionality, including any of the functionality described above and/or any additional functionality (including any functionality necessary to support the various embodiments described herein).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
3GPP $3^{rd}$ Generation Partnership Project
5G $5^{th}$ Generation
5G-CN Next Generation Core Network
ACK Acknowledgement
AMF Access and Mobility Management Function
AP Access Point
ASIC Application Specific Integrated Circuit
BS Base Station
BSC Base Station Controller
BTS Base Transceiver Station
CD Compact Disk
CN Core Network
CP Control Plane
CPE Customer Premises Equipment
CPU Central Processing Unit
CRC Cyclic Redundancy Check
D2D Device-to-device
DAS Distributed Antenna System
DL Downlink
DRX Discontinuous Reception DVD Digital Video Disk
eNB evolved Node B
EPC Evolved Packet Core
EPS Evolved Packet System
E-SMLC Evolved Serving Mobile Location Center
E-UTRAN Evolved Universal Terrestrial Radio Access Network
FPGA Field Programmable Gate Array
gNB The NR term corresponding to the term eNB in LTE,
GPRS General Packet Radio Service
GPS Global Positioning System
GSM Global System for Mobile Communications
HSPA High Speed Packet Access
IoT Internet of Things
IP Internet Protocol
IMS IP Multimedia Subsystem
IMSI International Mobile Subscriber Identity
LAN Local Area Network
LEE Laptop Embedded Equipment
LME Laptop Mounted Equipment
LTE Long Term Evolution
M2M Machine-to-Machine
MAC Medium Access Control
MAN Metropolitan Area Network
MCE Multi-cell/multicast Coordination Entity
MCS Modulation level and coding scheme
MDT Minimization of Drive Test
MIMO Multiple Input Multiple Output
MME Mobility Management Entity
MSC Mobile Switching Center
MSG Message
MSR Multi-standard Radio
MTC Machine-Type Communication
NACK Negative Acknowledgement
NAS Non-Access Stratum
NB-IoT Narrow band Internet of Things
NGC Next Generation Core
NR New Radio
O&M Operations and Management
OSS Operations Support System
PCC Policy Control and Charging
PDCCH Physical Downlink Control Channel
PDCP Packet Data Convergence Protocol
PDSCH Physical Downlink Shared Channel
PDU Protocol Data Unit
PRACH Physical Random Access Channel
P-RNTI Paging Radio Network Temporary Identifier
PSTN Public Switched Telephone Network
RAM Random Access Memory
RAN Radio Access Network
RAR Random Access Response
RAT Radio Access Technology
RLC Radio Link Control
RNC Radio Network Controller
RNTI Radio Network Temporary Identifier
ROM Read-Only Memory
RRC Radio Resource Control
RRH Remote Radio Head
RRU Remote Radio Unit
SAE System Architecture Evolution
SFN Single Frequency Network
SGW Serving Gateway
SON Self-Organizing Network
S-TMSI SAE Temporary Mobile Subscriber Identity
TA Tracking Area
TAI Tracking Area Index
TAU Tracking Area Update
TDD Time Division Duplex
TR Technical Report
TRP Transmission/Reception Point
TS Technical Specification
TX Transmission/Transmit
UE User Equipment
UL Uplink
UMTS Universal Mobile Telecommunications System
UP User Plane
WAN Wide Area Network
WiMax Worldwide Interoperability for Microwave Access
WLAN Wireless Local Area Network

The invention claimed is:

1. A method in a core network node comprising an Access and Mobility Management Function, the method comprising:
performing a non-access stratum procedure associated with a User Equipment (UE), wherein the non-access stratum procedure comprises an AMF registration procedure; and
sending, to a Radio Access Network (RAN) node, an indication that signaling associated with the AMF registration procedure is complete as part of a last message associated with the AMF registration procedure, the indication comprising an information element (IE) transferred in a signaling protocol header over a NG-C interface.

2. The method of claim 1, wherein:
the RAN node is one of a gNodeB (gNB) or eNodeB (eNB).

3. The method of claim 1, wherein:
the indication that the signaling associated with the AMF registration procedure is complete is a signal from a non-access stratum layer of the core network node.

4. The method of claim 3, wherein the signal from the non-access stratum layer of the core network node is sent as part of an NG-C message.

5. The method of claim 1, further comprising:
sending another message to the RAN node, after the AMF registration procedure has been initiated, indicating that the AMF registration procedure has started or is ongoing.

6. The method of claim 1, further comprising:
while the UE is in an inactive state, maintaining a connection between the core network node comprising the AMF and RAN node, and
wherein the AMF registration procedure is performed while the UE is in the inactive state.

7. A core network node comprising an Access and Mobility Management Function, the core network node comprising:
a network interface; and
processing circuitry coupled to the network interface, the processing circuitry configured to:
perform a non-access stratum procedure associated with a User Equipment (UE) wherein the non-access stratum procedure comprises an AMF registration procedure; and
send, via the network interface to a Radio Access Network (RAN) node, an indication that signaling associated with the AMF registration procedure is complete as part of a last message associated with the AMF registration procedure, the indication comprising an information element (IE) transferred in a signaling protocol header over a NG-C interface.

8. The core network node of claim 7, wherein:
the RAN node is one of a gNodeB (gNB) or eNodeB (eNB).

9. The core network node of claim 7, wherein:
the indication that the signaling associated with the non-access stratum procedure is complete is a signal from a non-access stratum layer of the core network node.

10. The core network node of claim 9, wherein the processing circuitry is configured to send the signal from the non-access stratum layer of the core network node as part of an NG-C message.

11. The core network node of claim 7, wherein the processing circuitry is further configured to:
send, via the network interface, another message to the RAN node, after the AMF registration procedure has been initiated, indicating that the AMF registration procedure has started or is ongoing.

12. The core network node of claim 7, wherein the processing circuitry is configured to:
while the UE is in an inactive state, maintain a connection between the core network node and RAN node, and
wherein the AMF registration procedure is performed while the UE is in the inactive state.

* * * * *